(12) United States Patent
Miller et al.

(10) Patent No.: US 7,811,482 B2
(45) Date of Patent: *Oct. 12, 2010

(54) CURVED OPTICAL DEVICE AND METHOD FOR MAKING THE SAME

(75) Inventors: Roy Miller, Akron, OH (US);
Volodymyr Bodnar, Kent, OH (US);
Bahman Taheri, Hudson, OH (US)

(73) Assignee: AlphaMicron, Inc., Kent, OH (US)

( * ) Notice: Subject to any disclaimer, the term of this patent is extended or adjusted under 35 U.S.C. 154(b) by 165 days.

This patent is subject to a terminal disclaimer.

(21) Appl. No.: 11/736,715

(22) Filed: Apr. 18, 2007

(65) Prior Publication Data
US 2007/0209393 A1   Sep. 13, 2007

Related U.S. Application Data

(63) Continuation-in-part of application No. 11/486,804, filed on Jul. 14, 2006, now Pat. No. 7,705,959, which is a continuation of application No. 09/956,507, filed on Sep. 18, 2001, now Pat. No. 7,102,602.

(51) Int. Cl.
*B29D 11/00* (2006.01)

(52) U.S. Cl. .................. 264/1.32; 65/17.6; 65/106

(58) Field of Classification Search ............. 264/1.32; 65/17.6, 106
See application file for complete search history.

(56) References Cited

U.S. PATENT DOCUMENTS

| | | | | |
|---|---|---|---|---|
| 3,880,636 A | * | 4/1975 | Tobin et al. ................. 65/107 |
| 4,267,208 A | * | 5/1981 | Ireland ....................... 427/154 |
| 4,279,474 A | | 7/1981 | Belgorod .................... 350/331 |
| 4,684,424 A | * | 8/1987 | Augason ..................... 156/163 |
| 4,883,548 A | | 11/1989 | Onoki ......................... 156/99 |
| 5,029,985 A | * | 7/1991 | Suzuki et al. ................ 349/74 |
| 5,194,973 A | | 3/1993 | Isogai et al. ................. 359/53 |
| 5,309,519 A | | 5/1994 | Park et al. ................... 381/190 |

(Continued)

FOREIGN PATENT DOCUMENTS

EP   0 341 519 A2   11/1989

(Continued)

OTHER PUBLICATIONS

*Conformable displays based on polymer-dispersed liquid-crystal materials on flexible substrates*—Journal of the SID: 11/2, 2003 pp. 289-295.

(Continued)

*Primary Examiner*—Eric Hug
*Assistant Examiner*—Jacob Thomas Minskey
(74) *Attorney, Agent, or Firm*—Renner Kenner Greive Bobak Taylor & Weber

(57) ABSTRACT

A method of constructing a curved optical device includes assembling of at least one cell having opposed flexible substrates with a controlled distance therebetween to form a gap adapted to receive a fluid. The process continues by holding only a portion of the cell in a fixture, positioning a curved mold surface proximal the cell and heating at least one of the curved mold surface and cell. Next, the cell is conformed to the mold surface so that the cell substantially retains the curved shape when the heat and the mold surface are removed.

19 Claims, 17 Drawing Sheets

U.S. PATENT DOCUMENTS

| | | | |
|---|---|---|---|
| 5,608,567 A | 3/1997 | Grupp | 359/275 |
| 6,180,033 B1 * | 1/2001 | Greshes | 264/1.32 |
| 6,261,398 B1 | 7/2001 | Costa | 156/102 |
| 6,262,787 B1 | 7/2001 | Kamoi et al. | 349/96 |
| 6,266,123 B1 * | 7/2001 | Maejima et al. | 349/160 |
| 6,319,433 B1 * | 11/2001 | Kohan | 264/1.32 |
| 6,416,908 B1 | 7/2002 | Klosner et al. | 430/5 |
| 6,433,770 B1 | 8/2002 | Gross et al. | 345/102 |
| 6,437,925 B1 | 8/2002 | Nishioka | 359/726 |
| 6,626,532 B1 | 9/2003 | Nishioka et al. | 351/41 |
| 6,697,039 B1 | 2/2004 | Yamakawa et al. | 345/98 |
| 7,102,602 B2 | 9/2006 | Kim et al. | 345/87 |
| 2001/0024685 A1 | 9/2001 | Boulton et al. | 427/162 |

FOREIGN PATENT DOCUMENTS

| | | |
|---|---|---|
| EP | 0 528 397 A2 | 2/1993 |
| EP | 0 816 902 A2 | 1/1998 |
| GB | 2 306 691 A | 5/1997 |
| GB | 2 315 338 A | 1/1998 |
| JP | 8-76058 | 3/1996 |
| JP | 9-258176 | 10/1997 |
| WO | WO 85/02914 | 7/1985 |
| WO | WO 93/14435 | 7/1993 |
| WO | WO 93/24858 | 12/1993 |
| WO | WO 94/11779 | 5/1994 |

OTHER PUBLICATIONS

Office Action of Mar. 29, 2004 in U.S. Appl. No. 11/486,804.
Office Action of Aug. 11, 2004 in U.S. Appl. No. 11/486,804.
Office Action of Jan. 26, 2005 in U.S. Appl. No. 11/486,804.
Office Action of May 18, 2005 in U.S. Appl. No. 11/486,804.
Office Action of May Oct. 31, 2005 in U.S. Appl. No. 11/486,804.
Advisory Action of Mar. 13, 2006 in U.S. Appl. No. 11/486,804.
Response as filed May 25, 2004 in U.S. Appl. No. 11/486,804.
Response as filed Aug. 26, 2004 in U.S. Appl. No. 11/486,804.
Response as filed Apr. 21, 2005 in U.S. Appl. No. 11/486,804.
Response as filed Aug. 16, 2005 in U.S. Appl. No. 11/486,804.
Response as filed Jan. 23, 2006 in U.S. Appl. No. 11/486,804.
Response as filed Mar. 31, 2006 in U.S. Appl. No. 11/486,804.
Avramov et al. "The Glass Transition Temperature of Silicate and Borate Glasses," Journal on Non-Crystalline Solids 351(2005) 472-476.
Plastics Process Engineering; James L. Throne (Marcel Dekker, Inc. 1979), Chapter 12. Thermoforming; p. 615, 12.1.
Polymer Processing by D.H. Morton-Jones (Chapman and Hall Ltd, 1989), Chapter 7: Thermoforming, p. 138, ¶ 7.1.
Textbook of Polymer Science by Fred W. Billmeyer, Jr. (Third Ed. John Wiley & Sons, 1984): middle of p. 321.
Technology of Thermoforming, by James L. Throne (Hanser/Gardner Publications, Ind., 1996), p. 66, lines 4-5.
Encyclopedia of Chemical Technology, by Raymond E. Kirk and Donald F. Othmer, ($3^{rd}$ Ed., John Wiley & Sons, 1983), vol. 21, pp. 830-831.
Declaration of Dr. Miko Cakmak under 37 C.F.R. § 1.132, Mar. 2, 2010.

* cited by examiner

CURVED OPTICAL DEVICE AND METHOD FOR MAKING THE SAME

CROSS REFERENCE TO RELATED APPLICATION

This application is a continuation-in-part application of prior application Ser. No. 11/486,804, filed Jul. 14, 2006, now U.S. Pat. No. 7,705,959, which is a continuation application of prior application Ser. No. 09/956,507 filed Sep. 18, 2001, now U.S. Pat. No. 7,102,602 both of which are incorporated by reference.

TECHNICAL FIELD

The invention herein resides generally in the art of optical devices. More particularly, the present invention relates to a curved optical device and the method for making the same. Specifically, the present invention relates to a doubly or complex curved device where a fluid medium is captured therein. And the present invention relates to forming a curved optical device using a single rigid forming surface.

BACKGROUND ART

One critical aspect of many optical elements is the curvature of the surface of the element. Indeed, refractive lenses derive their ability to converge or diverge light rays from the difference in curvature of their front and rear surfaces. Similarly, the focal plane of curved mirrors is determined by the mirror curvature. For most lenses and mirror applications, the surfaces in question have a spherical shape. One exception to this is lenses for correcting astigmatism which have a curvature that is a combination of spherical and cylindrical surfaces. The key feature of all these elements is that they have two-dimensional surfaces and, therefore, they have two principle curvatures. For example, a flat surface has both curvatures equal to zero. A cylindrical surface has one curvature zero while the other curvature is non-zero. A sphere may be defined as having both curvatures equal to one another and are non-zero. Accordingly, it will be appreciated that optical elements, with almost no exceptions, are constructed using surfaces for which both curvatures are non-zero and non-equal. Accordingly, those skilled in the art refer to these types of elements as doubly curved.

The most common optical element is the vision-correction lens used in spectacles. For all but the most severe prescriptions, these lenses are meniscus lenses, in which both surfaces are doubly curved. Corrective lenses may be fabricated having one surface doubly curved and the other flat, but this construction is undesirable for esthetic reasons, inasmuch as human faces are also doubly curved. In addition to vision correction, spectacles with doubly curved lenses are worn to protect the eyes from sunlight, glare, and foreign objects, and of course, they are also used as fashion accessories. Other types of eyewear having doubly curved surfaces are goggles, visors, and helmet face plates. Other examples of doubly curved surfaces which light must pass either through or reflect from are windshields, glass block windows, automobile headlamps, skylights, and related optical devices.

For these and many other applications, it is common to affix a solid layer or layers unto the surface of an optical element. The layer or layers usually are affixed to provide additional optical functionality, such as light transmission control, or anti-reflective properties. Accordingly, each additional layer acts as an optical element in its own right and when it is attached to another element, the result is a compound element. Various difficulties arise when attempting to manufacture optical elements and one of these layers is attached to a doubly curved surface. In particular, the layer to be affixed to the doubly curved surface is initially flat. For example, one may create a pair of "mirrored sunglasses" by affixing aluminized Mylar® onto the lenses of an ordinary pair of glasses. It is quickly seen that unless the initially flat Mylar® is either stretched or cut, it cannot be conformally attached to the doubly curved lens surface. Alternatively, the initially flat layer may be affixed by changing the state of the layer material during the affixing process. If the layer is softened, or even melted and affixed to the state, it can be conformally attached. Obviously, the resulting compound optical element must then be operated at a temperature lower than the temperature at which the layer was affixed.

Although affixing solid layers in the manner described above has been accomplished, many more difficulties arise when it is desired to affix multiple layers to an optical element, especially when these two layers are separated from one another by a controlled distance. In other words, this controlled distance provides a gap between the two optical layers and this gap, extending over the area of the optical element, creates an encapsulated volume. This encapsulated volume may be occupied by a fluid substance or substances that perform desired optical, protective, or other functions. One such device is disclosed in U.S. Pat. No. 6,239,778, which is incorporated herein by reference. The resulting compound optical element would then have electronically controllable light transmission. Those skilled in the art will appreciate that maintaining the gap in such devices is critical to ensure correct operation.

Attempts at providing a controlled gap between two doubly curved surfaces with a fluid material therebetween has been found to be quite problematic. One attempt at solving this problem is to employ doubly curved half-lenses which are separated by spacers of the desired gap distance. However, due to the small cell gaps that are required for such devices—on the order of microns—it is difficult to properly align both lenses while maintaining the required gap distance over the entire area of the lenses. It will be appreciated if the proper gap spacing is not maintained; the desired optical properties are likewise unattainable. And it is has been found to be quite difficult to properly shape the outer surfaces of such devices so that they conform to the shape of adjacent optical elements.

Other methods for obtaining ophthalmic lenses can be tailored to correcting individual's vision by cementing together two stock "half-lenses" such that the resulting compound lens has the correct prescription. This method of producing of laminated lenses is described in U.S. Pat. Nos. 4,883,548 and 6,180,033. However, these disclosures do not address the need for maintaining a controlled gap distance between the lenses so that a fluid material can be employed to control light transmission or reflection properties. Accordingly, there is a need in the art for a device and a method for making the same that provides curved surfaces in which a gap can be repeatably maintained between the curved surfaces.

Although the methodology developed for forming a curved optical device having a gap between opposed substrates has been found effective, it will be appreciated that different end-use applications for optical devices may require different thermoforming techniques. In other words, the best thermoforming technique depends on many factors including the choice of substrate material or area or curvature of the optical device. Therefore, there is a need for methodologies to form an optical device that is adaptable to the different types of substrates or other features of an optical cell that are required for an end-use application. In particular, substrate material size, curvature, optical clarity and other requirements of a curved optical device require advancements in the techniques needed for forming the same.

SUMMARY OF THE INVENTION

In light of the foregoing, it is a first aspect of the present invention to provide a curved optical device for eyewear and method for making the same.

It is another aspect of the present invention to provide a curved optical device which incorporates opposed substrates with a controlled distance therebetween.

It is a further aspect of the present invention to provide a curved optical device, as set forth above, to maintain the controlled distance between the substrates by use of spacers.

It is yet another aspect of the present invention, as set forth above, to provide the substrates with coatings to control the properties of a fluid material that may be captured between the substrates, wherein the coatings may be electrodes, alignment layers, and the like.

It is still another aspect of the present invention to provide a curved optical device, as set forth above, wherein the substrates are curved with the curvature property of up to 10 diopter in at least one dimension.

It is still a further aspect of the present invention to provide a curved optical device, as set forth above, wherein the device is formed by a process that heats the temperature of an initially flat pair of opposed substrates with the controlled distance therebetween to a predetermined temperature before, during, or after application of a controlled pressure to the substrates so that they conform to the desired curved shape.

It is an additional aspect of the present invention to provide a curved optical device and method for making the same, as set forth above, to provide opposed mold faces to conform the opposed substrates so that the desired curved shape is formed, whereupon the pressure and heat are removed in such a manner so that the curved shape remains while maintaining the desired controlled distance between the substrates.

It is yet another aspect of the present invention to provide a curved optical device and method for making the same, as set forth above, wherein a fluid material is captured between the substrates. In regard to this aspect of the invention, the fluid material may be filled prior to or after the forming process.

It is still yet another aspect of the present invention to provide a curved optical device, as set forth above, wherein an initially curved optical device that includes substrates with a controlled distance therebetween may be imparted with the heat and pressure as indicated above to further impart additional curvature properties to the device.

Yet an additional aspect of the present invention is to provide a curved optical device, as set forth above, wherein the substrates are attached to a half-lens which substantially conforms to one of the surfaces of the curved device.

Still yet another aspect of the present invention is to provide a curved optical device, as set forth above, wherein a second half-lens that substantially conforms to the other side of the curved device is attached thereto.

Further aspects of the present invention include providing a holding fixture that secures at least an outer peripheral portion of a cell formed from a pair of opposed substrates with a controlled distance therebetween. The substrates are heated and a force is applied so that the cell comes into contact with a forming surface. The force may be a mechanical force that moves the mold into the cell or the cell into the mold. The force may also be a fluid assist, where the fluid is a gas or a liquid. The forming process may also be used in any number of ways to secure the device to a carrying mechanism.

The foregoing and other aspects of the present invention, which shall become apparent as the detailed description proceeds, are achieved by the curved optical device and method of making the same.

Other aspects of the present invention are attained by a method of constructing a curved optical device, comprising assembling at least one cell having opposed flexible substrates with a controlled distance therebetween to form a gap adapted to receive a fluid holding only a portion of at least one cell in a fixture and positioning a curved mold surface proximal the at least one cell. Other aspects also include heating at least one of the curved mold surface and the at least one cell, and conforming the at least one cell to the mold surface so that the at least one cell substantially retains the curved shape when the heat is removed.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
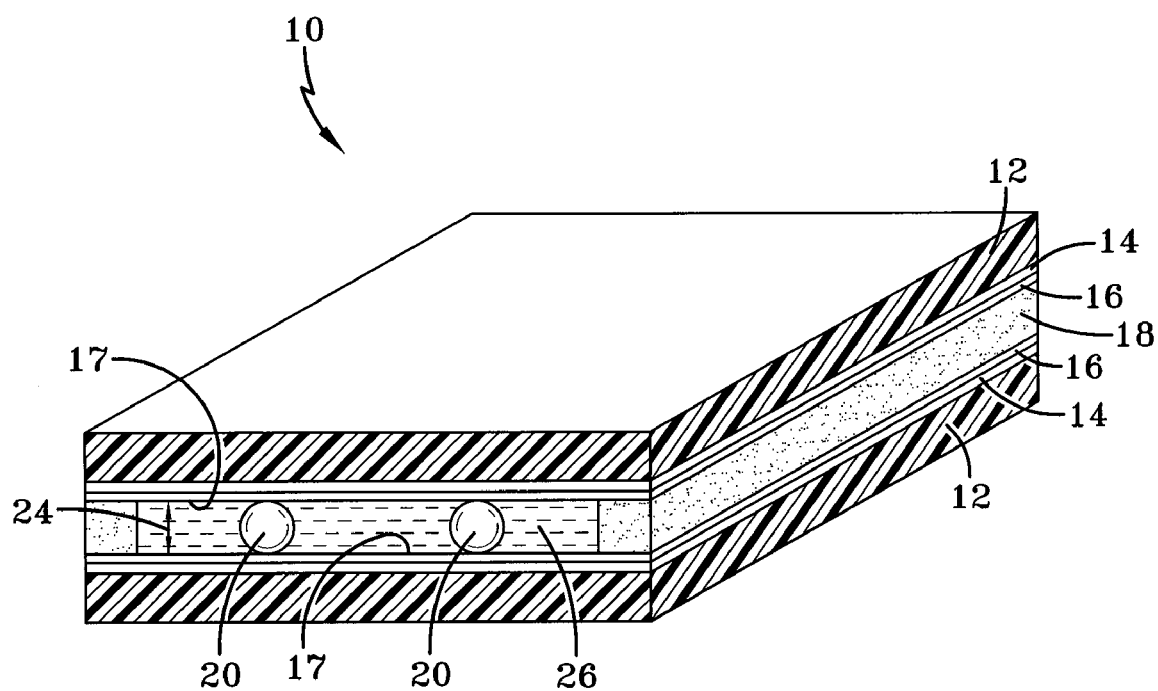
FIG. 1 is a schematic diagram of the separated layer stack which is employed in the formation of a curved optical device.

Referring now to the drawings and, more particularly, to FIG. 1, it can be seen that a separated layer stack utilized in manufacturing the present invention is designated generally by the numeral 10. The stack 10 may also be referred to as a film or a cell. Generally, the stack 10 includes a pair of opposed substrates 12. In the preferred embodiment, the substrates 12 are substantially flat sheets of thermoplastic polymer. Applied to each substrate may be any number of coatings required for the proper optical operation of the completed optical device. These coatings may include a conductive or electrode layer 14, such as indium tin oxide, possibly patterned for an electro-optic device. An alignment layer 16 may also be provided on the electrode layer 14 to control the orientation of any liquid crystal materials disposed between the substrates. Other coatings may include an anti-reflection coating for an eyewear device, an ultraviolet blocking layer for solar protection and the like. It will be appreciated that such coatings are not affected during the fabrication of the completed device. With the coatings applied, the substrates have an inner surface 17 which refers to the surface that adjoins an encapsulated volume while an outer surface of substrates is the surface not adjoining the encapsulated volume. A sealing material 18 is provided around the outer periphery or edges of the inner surfaces 17 of the substrates 12 and are ultimately sealed to prevent any encapsulated fluid from leaking from between the substrates 12.

Spacer materials 20 of the same size are introduced onto the inner surface 17 of one or both prepared substrates 12. The spacers 20 prevent the two inner substrates surfaces 17 from being any closer to one another than the spacer size. The spacers are constructed of a material that is more rigid than the substrate material at every stage of the manufacturing process. As will be appreciated, the spacers used are selected such that the desired optical device is obtained. The two flat substrates 12 are positioned facing one another, inner surface 17 to inner surface 17, with the spacers 20 therebetween to form a "sandwich" structure. It is believed that the spacers may be sized anywhere between about 3 μm to about 2 mm. If desired, a fluid material 26 is introduced at this time into the gap or controlled distance 24 by capillary action or vacuum filling. Alternatively, a desired fluid material 26 may be applied to one inner surface either before or after the spacers are applied and the other substrate is positioned. Or, the spacers may be mixed or otherwise incorporated in the desired fluid, and this combination may be applied to one inner surface before the other substrate is positioned. The fluid material 26 is likely a liquid crystal material, but it could also be a solution containing a dye, for example, a photochromic dye; electrochromic electrolytes; or resins. In any event, the sealing material 18 encloses the entire stack 10 so as to retain the fluid material 26. It will be appreciated that the sealing material may be an adhesive that is compatible for use with the thermoplastic polymer material of the substrates and will have a temperature compatible with the other steps of the manufacturing process. As will be discussed later, the fluid material could be filled between the substrates after a curvature is imparted to the stack.

Figure 2:
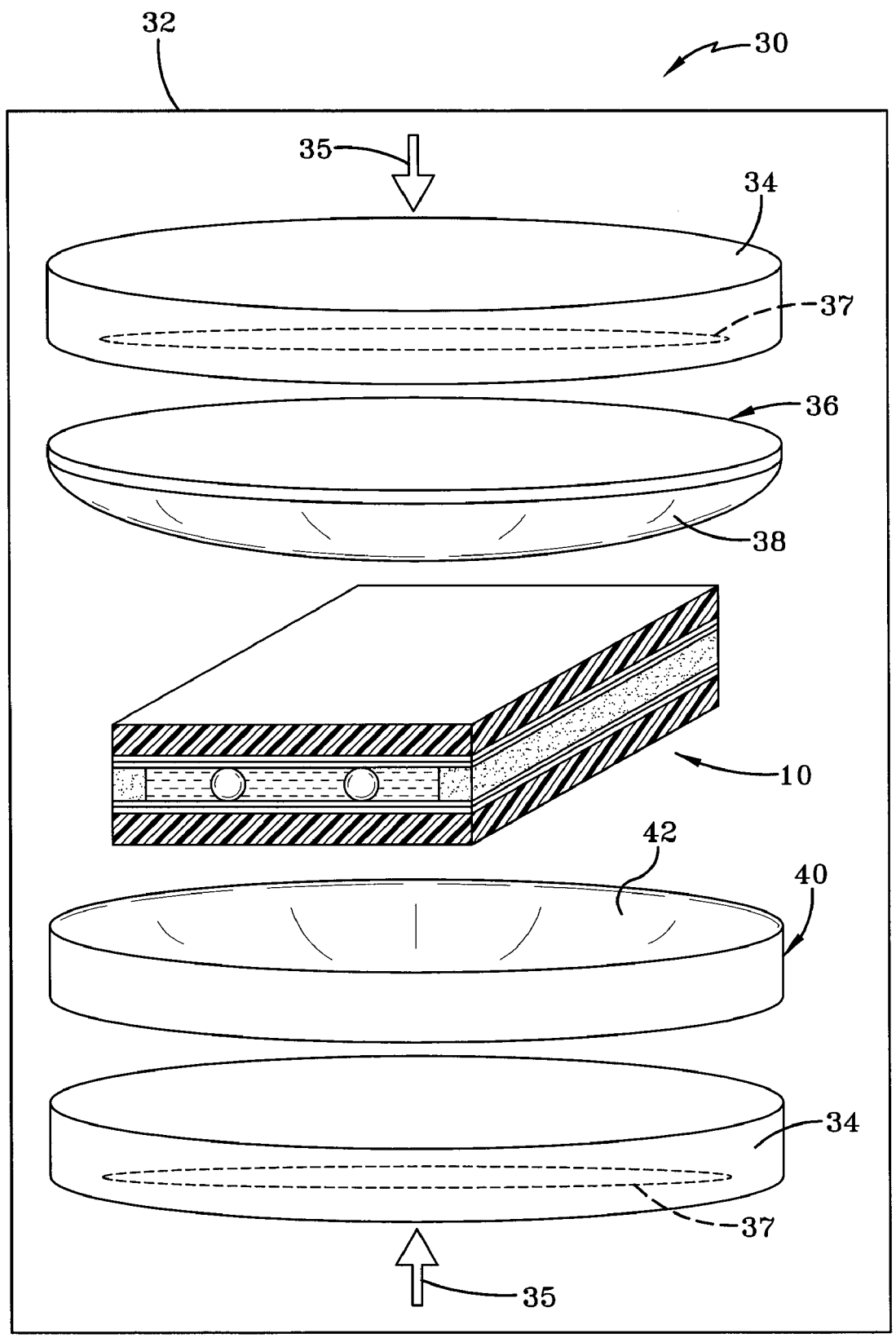
FIG. 2 is a schematic diagram showing an apparatus for forming the device.

Referring now to FIG. 2, it can be seen that a forming apparatus, designated generally by the numeral 30, may be employed to manufacture a curved optical device. The apparatus 30 includes a heat chamber 32 which is able to raise and lower temperatures as needed during the manufacturing process. Contained within the heat chamber 32 are a pair of opposed platens 34 which are adaptable to receive pressure forces 35 so as to allow for closure and opening of the platens 34 in a conventional manner. Application of the pressure force 35 is controlled and coordinated with the application of heat 32 in a manner that will be described below. Heating elements 37 may be carried by the platens 34 or even the molds 36, 40. Alternatively, the stack may be heated in a separate chamber and then transferred in a timely manner to the molds for forming. Attached to the upper platen is a half-mold 36 which provides a mold face 38. Likewise, attached to the lower platen 34 is a second half-mold 40 which has a mold face 42.

The initially flat, separated layer stack 10 is inserted between the two mold faces 38 and 42, wherein each mold face possess the desired final shape for each side of the optical device. The faces may be mates for one another, such that by themselves, one fits tightly inside the other with minimal residual space therebetween. Or one mold face may have a slightly different curvature than the other mold face depending upon the end use of the device. The mold faces 38, 42 remain rigid and undeformable throughout the fabrication process. The layer stack 10 is brought to an elevated temperature by the chamber 32, and a compressive force 35 is applied to the stack 10 by the platens 34, wherein the force is essentially perpendicular to the initially flat layer. The temperatures and the compressive forces are believed to be critically linked in forming the end product. The combination of temperature and force must be large enough so that the substrate 12 conforms to the mold faces 38, 42, and so that they permanently retain the mold face shape after the temperature is lowered and the force removed. In other words, no other restraining forces are required to maintain the curved shape of the optical device. However, the temperature and force must not be great enough to bring the inner substrate surfaces closer to one another than the size of the spacers. It has been found that if the temperature and/or force are too large, the substrates become too close to each other and the substrates soften too much adjacent the individual spacers, thus dimpling the substrate. Accordingly, the temperature/force combination and their rates of application must be large enough to imbue the initially flat layer stack 10 with the desired curved shape, but not large enough to change the separation between the substrate inner surfaces 17. At a higher processing temperature, a smaller compression force is required. Conversely, at a lower processing temperature, a greater compression force is needed. It will be appreciated that the temperature of the process must never exceed the melting temperatures of the substrates. The operating temperature of the completed optical device produced in this manner is below the thermal forming temperature. The compressive force and elevated temperature are applied to the stack 10 a sufficient time such that the stack 10 retains the shape imbued by the molds after the force is removed and the temperature lowered. Moreover, the shape remains without the application of any other force.

Figure 3:
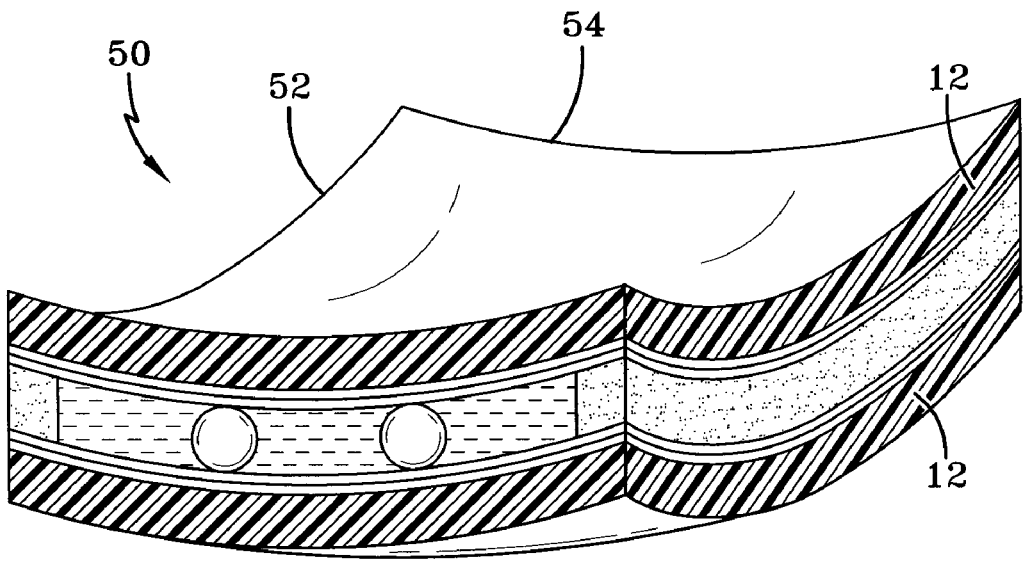
FIG. 3 is a cross-sectional schematic drawing of the device after the forming process.

As best seen in FIG. 3, after the stack 10 is removed from the forming apparatus 30, a doubly curved optical device, designated generally by the numeral 50, is provided. It will be appreciated that such the forming apparatus 30 may form only a singly curved device, but it is believed that a doubly curved device provides the most functionality. In any event, the foregoing process is believed capable of producing a device 50 which has a first curvature angle 52 corresponding to 0 to 10 diopter and, independently, a second curvature 54 corresponding to 0 to 10 diopter. A definite upper diopter limit using this process has not yet been realized. It has been found that the foregoing process maintains the controlled distance between the inner surfaces throughout the entire area of the device so that the desired optical properties are uniform and acceptable for use in controlling the transmission and/or reflection of light.

The encapsulated volume within the element described in the preferred embodiment can contain any substance that is a fluid at the apparatus forming temperature and compressive force. This substance may or may not remain a fluid at the operating temperature of the device. In some instances, it may be desirable for the encapsulated volume to contain nothing. It will also be appreciated that the sealing material 18 may be sealed during the thermoforming process rather than before the thermoforming process. Accordingly, when the sandwich or stack 10 is assembled, a pattern of adhesive can be "printed" on one of the inner substrates around the perimeter of the desired encapsulated volume. In the event a fluid material was not filled between the substrates prior to forming a curved shape, it may be done after the forming process provided an opening is provided through the sealing material.

The completed device 50 could also be manufactured by employing substrates that are initially curved rather than flat. It is believed that by using initially curved substrates, one may obtain a larger final curvature or area of the finished element than could be obtained using initial flat substrates. Accordingly, the total amount of curvature can be improved. Accordingly, this embodiment may be useful for producing devices requiring large curvatures, such as devices applied to helmet face plates. Moreover, complex curves may be obtained—such as around a nose bridge area—for manufacturing goggles.

EXAMPLE 1

Two coated thermoplastic polyester substrates 12 (for example, OC-100 from CPFilms, Inc.) having a diameter of about 2 inches with electrodes 14 are coated with an alignment layer material solution (for example, JALS 204-R40 from Japan Synthetic Rubber Co.) to form an alignment layer 16 with a preferable thickness of 0.1 μm after the coating is dried up. Spacers 20 of a 5 μm diameter (for example, Licristar 50 from EM Industries, Inc.) are distributed uniformly to control the gap 24 throughout the stack 10. Preferably, the spacers 20 are embedded in at least one alignment layer 16 to prevent the spacers 20 from moving around and aggregating themselves in the presence of an external pressure 35 during a thermoforming process. At least one alignment layer 16 is rubbed using a velvet cloth to align the liquid crystal material 26. The stack 10 is constructed by assembling the two substrates, alignment layers facing to each other, after the sealing material 18 such as an adhesive (for example, Loctite 349 from Loctite Corp.) is dispensed on at least one surface 17 along the edge of a cell leaving at least one opening. The adhesive is cured to keep the spacing between the substrates. The cell is filled with a liquid crystal formulation 26 (for example, ZLI 2806 from EM Industries, Inc.) through the opening. The opening is sealed with an edge sealing adhesive, and the adhesive is cured to encapsulate the formulation 26. The stack 10 is placed between glass lenses (for example, Plano CVX BK7 and Plano CNCV BK7 from OptoSigma, Inc.) which are used as molds 36, 40 such that the entire cell area is subject to a pressure 35 via contacts with the faces 38, 42 during a thermoforming process. The two inch plano-convex and plano-concave glass lenses have a focal length of ~150 mm that correspond to 6.8 diopter. On the top of the mold 36 a pressure 35 using the load of 0.5 to 2 kg is applied to keep pressing the cell 10. The whole stack is transferred into a chamber 32 at 115° C., and kept for 1 to 20 hours to achieve a desired curvature from thermoforming. The whole stack is removed from the chamber 32 to cool down to a temperature below 50° C. and a doubly curved liquid crystal cell 50 is formed.

The resulting curvature depends upon the thermoforming temperature, pressure, and diopter of the top and bottom glass lenses used. A curvature corresponding up to 8 diopter has already been fabricated with this technique. Being filled with a guest-host formulation of a chiral material (for example, S-811 from EM Industries, Inc.), dye (for example, S-428 from Mitsui Toatsu Chemicals, Inc.), and liquid crystal (for example, ZLI 2806 from EM Industries, Inc.) the cell exhibited same electro-optical properties before and after thermoforming, such as light transmission of 52 to 12% and haze less than 3%.

EXAMPLE 2

Two coated thermoplastic polycarbonate substrates 12 (for example, HA120-B60 from N.I. Teijin Shoji Co., Ltd.) having a diameter of about two inches with electrodes 14 are coated with an alignment layer material solution (for example, JALS 204-R40 from Japan Synthetic Rubber Co.) to form an alignment layer 16 with a preferable thickness of 0.1 μm after the coating is dried up. Spacers 20 of a 5 μm diameter (for example, Licristar 50 from EM Industries, Inc.) are distributed uniformly to control the gap 24 throughout the stack 10. Preferably, the spacers 20 are embedded in at least one alignment layer 16 to prevent the spacers 20 from moving around and aggregating themselves in the presence of an external pressure 35 during a thermoforming process. At least one alignment layer 16 is rubbed using a velvet cloth to align the liquid crystal material 26. The stack 10 is constructed by assembling the two substrates, alignment layers facing to each other, after the sealing material 18 such as an adhesive (for example, Loctite 349 from Loctite Corp.) is dispensed on at least one surface 17 along the edge of a cell leaving at least one opening. The adhesive is cured to keep the spacing 24 between the substrates. The cell is filled with a liquid crystal formulation 26 (for example, ZLI 2806 from EM Industries, Inc.) through the opening. The opening is sealed with the adhesive and the adhesive is cured to encapsulate the formulation 26. The cell 10 is placed between glass lenses (for example, Plano CVX BK7 and Plano CNCV BK7 from OptoSigma, Inc.) which are used as platens 36, 40 such that the entire cell area is subject to a pressure 35 via contacts with the faces 38, 42 during a thermoforming process. The two inch plano-convex and plano-concave glass lenses have a focal length of ~150 mm that correspond to 6.8 diopter. The stack is transferred into a chamber 32 at 115° C., and kept for 1-2 hours to soften the stack 10. On the top of the mold 36 a pressure 35 using the load of 0.5 to 2 kg is applied to thermoform the stack 10. The whole stack is removed from the chamber 32 to cool down to a temperature below 50° C. and a doubly curved liquid crystal cell 50 is formed.

The resulting curvature depends upon the thermoforming temperature, pressure, and diopter of the top and bottom glass lenses used. The curvature corresponding up to 8 diopter has already been fabricated with this technique. Being filled with a guest-host formulation of a chiral material (for example, S-811 from EM Industries, Inc.), dye (for example, S-428 from Mitsui Toatsu Chemicals, Inc.), and liquid crystal (for example, ZLI 2806 from EM Industries, Inc.) the cell exhibited same electro-optical properties before and after thermoforming, such as light transmission of 60 to 13% and haze less than 3%.

EXAMPLE 3

Two coated thermoplastic polyester substrates 12 (for example, OC-100 from CPFilms, Inc.) having a diameter of about two inches with electrodes 14 are coated with an alignment layer material solution (for example, JALS 204-R40 from Japan Synthetic Rubber Co.) to form an alignment layer 16 with a preferable thickness of 0.1 cm after the coating is dried up. Spacers 20 of a 5 μm diameter (for example, Licristar 50 from EM Industries, Inc.) are distributed uniformly to control the gap 24 throughout the stack 10. Preferably, the spacers 20 are embedded in at least one alignment layer 16 to prevent the spacers 20 from moving around and aggregating themselves in the presence of an external pressure 35 during a thermoforming process. At least one alignment layer 16 is rubbed using a velvet cloth to align the liquid crystal material 26. The stack 10 is constructed by assembling the two substrates, alignment layers facing to each other, after the sealing material 18 such as an adhesive (for example, Loctite 349 from Loctite Corp.) is dispensed on at least one surface 17 along the edge of a cell leaving at least one opening. The adhesive is cured to keep the spacing 24 between the substrates. The empty cell 10 is placed between molds 36, 40 which may be in the form of glass lenses (for example, Plano CVX BK7 and Plano CNCV BK7 from OptoSigma, Inc.) such that the entire cell area is subject to a pressure 35 via contacts with the mold surfaces 38, 42 during a thermoforming process. The two inch diameter plano-convex and plano-concave glass lenses have a focal length of ~150 mm that correspond to 6.8 diopter. On the top of the mold 36 a pressure 35 using the load of 0.5 to 2 kg is applied to keep pressing the empty stack 10. The whole stack is transferred into the chamber 32 at 115° C., and kept for 1 to 15 hours to achieve a desired curvature from thermoforming. The whole stack is removed from the chamber 32 to cool down to a temperature below 50° C. and a doubly curved cell 50 is formed. The resulting curvature depends upon the thermoforming temperature, time, pressure, and diopter of the top and bottom glass lenses used. The curvature corresponding up to 8 diopter has already been fabricated with this technique.

The doubly curved cell 50 is filled with a liquid crystal formulation 26 (for example, ZLI 2806 from EM Industries, Inc.) through the opening. The opening is sealed with the edge sealing adhesive and the adhesive is cured to encapsulate the formulation 26. Being filled with a guest-host formulation of a chiral material (for example, S-811 from EM Industries, Inc.), dye (for example, S-428 from Mitsui Toatsu Chemicals, Inc.), and liquid crystal (for example, ZLI 2806 from EM Industries, Inc.) the cell exhibited same electro-optical properties before and after curved, such as light transmission of 52 to 12% and haze less than 3%.

Figure 4:
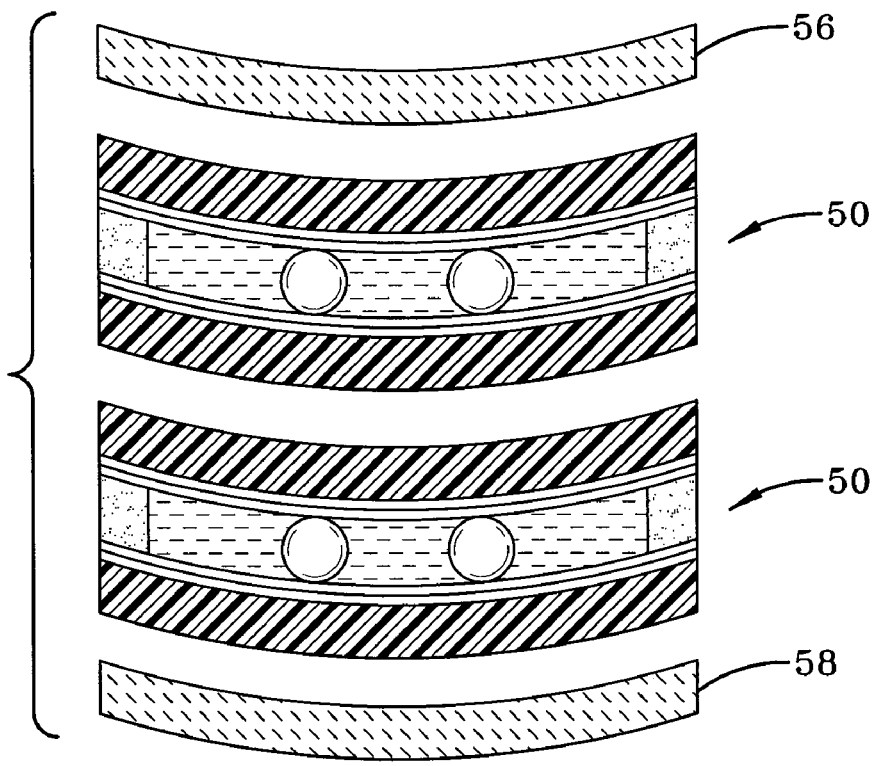
FIG. 4 is a cross-sectional view of the optical device positioned between two half-lenses.

The advantages of the foregoing process and device are readily apparent. Primarily, the process allows for the mass production of optical elements 50 that can be secured to existing half-lenses 56 and 58 as seen in FIG. 4. Indeed, any number of optical elements 50 can be stacked adjacent one another and be placed adjacent one lens or between half-lenses. This would allow for multiple combinations of optical properties to be provided by a single device. For example, one stack could contain a liquid crystal material, and a second adjacent stack could have a dye. Such a device would impart functionality that can only be provided by the fluid medium, such as a liquid crystal material. Moreover, such a device can be provided which is conformal to existing shapes so as to be compatible with eyewear fashions that are functional, yet remain lightweight. The methodology and device described above also provides a device which is curved and which maintains the controlled gap spacing between substrates that is required to ensure the effective operation of the device while providing the desired optical properties.

Figure 5:
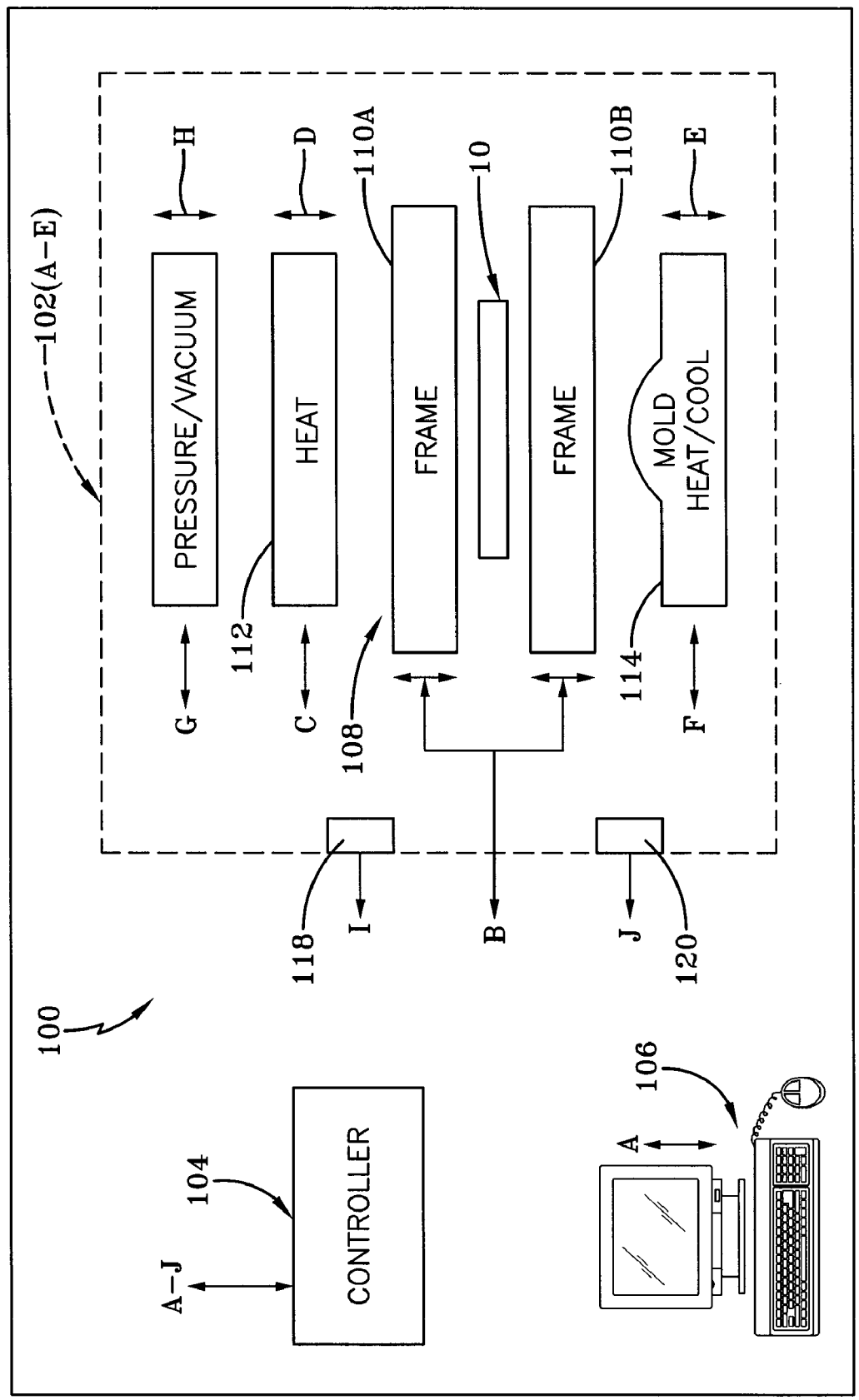
FIG. 5 is a schematic diagram showing an apparatus for forming the curved optical device.

Referring now to FIG. 5, it can be seen that a thermoforming apparatus is designated generally by the numeral 100. The apparatus 100 provides for repeatable manufacture of a thermoformed doubly curved optical device and which allows for incorporation of additional components into the thermoforming process. Specific components of the apparatus may or may not be used, as will be appreciated in the discussion of the following embodiments.

The thermoforming apparatus 100 includes a thermoformer 102 (A-E) which is linked to a controller 104. The alphabetic suffixes A-E associated with the thermoformer 102 are representative of different embodiments. It will be appreciated that links between the controller and the thermoformer, and also a user interface 106, are generally designated by the capital letters A-J. The controller 104 provides the necessary hardware, software and memory devices to operate the thermoformer 102 based upon inputs provided by the user interface 106 and other sensors that may be associated with the thermoformer 102. The controller 104 communicates the necessary feedback to the user interface and receives input therefrom by signal line A so that all processes associated with the thermoformer may be monitored and adjusted as needed. The user interface 106 comprises a display screen, a keyboard, and a mouse. Of course, any number or type of input devices could be used.

The thermoformer 102 has a number of primary components. The first primary component is a holding fixture 108 which functions to hold the separated layer stack 10, also referred to as a film or cell, in tension. In other words, the holding fixture 108 is configured so that only a portion of the cell, such as a selected area of the cell's peripheral edge, is held. The holding fixture 108 has an opening therethrough which can be seen in the views to be discussed. The holding fixture 108 comprises a pair of opposed frames 110A and 110B. The frames may be movable with respect to each other, or one frame may be held in a fixed position while the other frame is moved with respect to that held frame. Movement and control of the frames is designated via the signal line B. A heating unit 112 is positionable with respect to the frame 108, wherein the temperature generated by the heating unit may be controlled via the signal line C and motion of the heating unit with respect to the other components is controlled by the signal line D. As will become apparent, the heating unit or similar temperature control elements may be incorporated with other components of the thermoformer. The heating unit 112 raised the ambient temperature of the area around the cell so that the substrates of the separated layer stack are placed in a "plastic state." As used herein, plastic state means "capable of being deformed continuously and permanently in any direction without rupture." See *Webster's New Collegiate Dictionary*, $8^{th}$ Ed.

A mold 114 may be movable with respect to the other components contained in the thermoformer 102. The temperature of the mold is controlled via the signal line F and movement of the mold with respect to the other components is controlled via the signal line E. A pressure/vacuum source 116, which may be used to assist in conforming the cell to the mold, may also be provided in the thermoformer 102. Application of pressure and/or a vacuum is controlled via the signal line G and positioning of the pressure/vacuum source 116 is controlled via the signal line H. Various types of sensors may be associated with the thermoformer and, at a minimum, a temperature sensor 118 provides an input via the signal line I to the controller 104, and a pressure sensor 120 provides an input via the signal line J to the controller 104.

Prior to discussing specific embodiments, some basic features of the thermoformer 102 utilized with the thermoforming device 100 will be discussed. The mold 114 is an engineered solid surface with a well-characterized contour. This contour is utilized to impart a desired shape to form a curved, doubly curved or complex curved configuration of the separated layer stack 10. The mold 114 is solid so that it will not deform at any of the temperatures and/or pressures employed to thermoform the liquid crystal cell and has a sufficient hardness.

The mold 114 may consist of a single component of a solid material, such as a single piece of metal, or as multiple components of solid materials, such as a lens or other optical component resting upon a support provided by the mold. The liquid crystal film or cell is held in tension by the holding fixture 108 while the cell is heated and conformed to the mold 114. The holding fixture 108 is configured so as to hold at least portions of the edges of the liquid crystal film as it is heated and formed. The thermoforming process can be further facilitated by a "fluid assist." In other words, a fluid, which may be a gas or liquid, can be utilized in a pressurized form to push the heated liquid crystal film into or onto the mold. Alternatively, an appropriate vacuum may be utilized to pull the heated liquid crystal film onto the mold surface. Or, it will be appreciated that a combination of pressurized gas and vacuum may be used to "persuade" or manipulate the heated cell to conform to the mold surface. In the event that the fluid is a liquid, it will be appreciated that an appropriately pressurized liquid can be used to push the heated liquid crystal cell on to the mold surface.

As a supplement to the thermoforming processes, which will be discussed in detail later, it will be appreciated that if the liquid crystal cell is thermoformed against an optical element, such as a previously created lens or visor, then the thermoformed liquid crystal cell can be mechanically attached to the optical element while it is being thermoformed. Indeed, various attachment processes can be utilized to secure the liquid crystal cell to an optical element. For example, by an appropriate choice of materials, the heat and pressure of thermoforming alone may be sufficient to facilitate attachment of the liquid crystal cell to the optical element. Alternatively, it is possible to provide a coating on one of the surfaces of the optical element and/or the liquid crystal cell with a material, or materials, that will facilitate attachment during thermoforming. Another means of attachment may consist of placing a separate coating or film, such as a pressure sensitive adhesive (PSA), between the liquid crystal cell and the optical element prior to thermoforming. Heat and pressure cause both the PSA and the liquid crystal cell to conform to the optical element.

Figure 6:
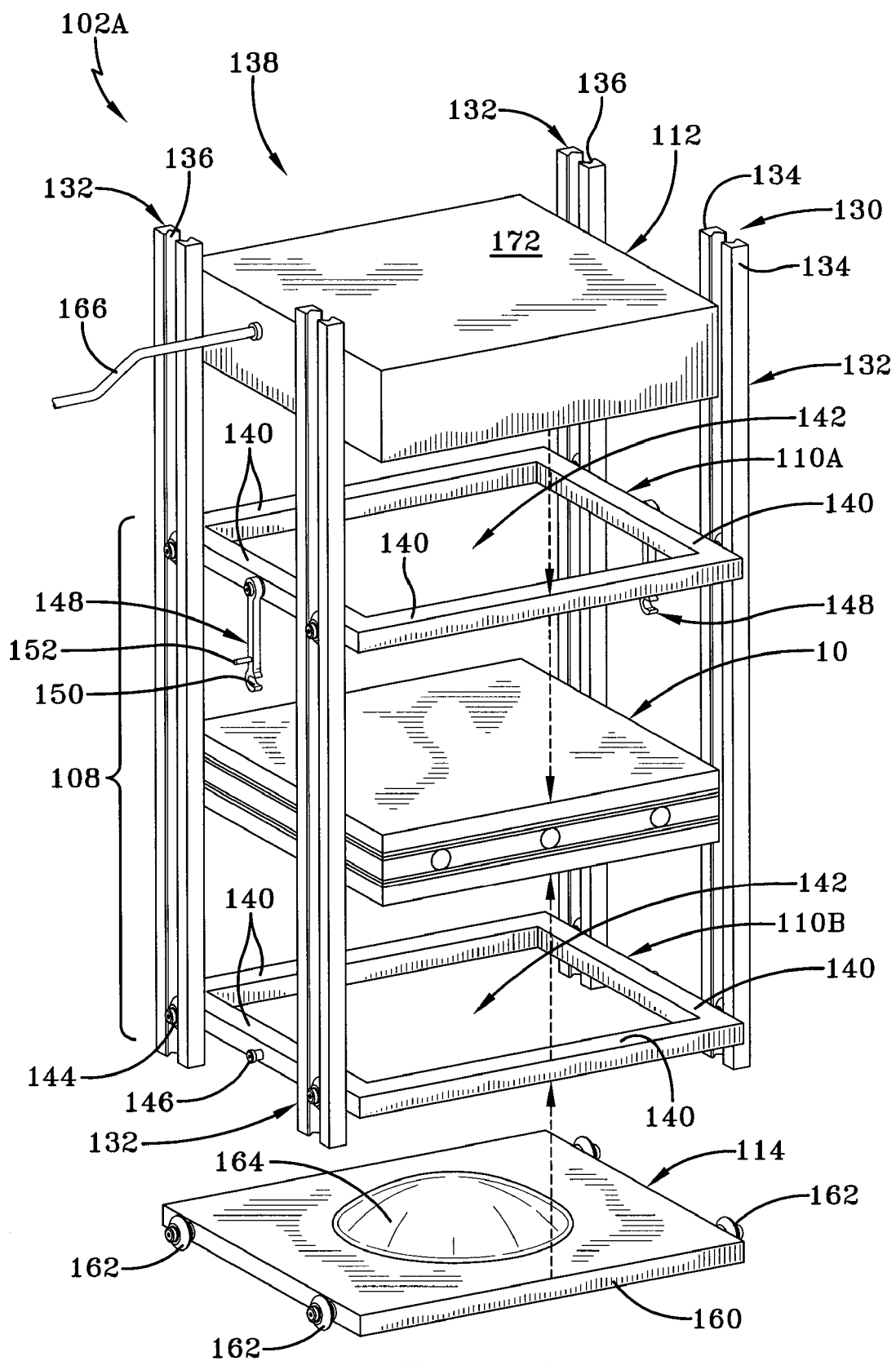
FIG. 6 is a perspective schematic diagram of a thermoformer according to concepts of the present invention.

Referring now to FIG. 6, it can be seen that an exemplary thermoforming apparatus is designated generally by the numeral 102A. The apparatus 102A is utilized to thermoform the stack 10 which has been assembled as previously described. As noted, the separated layer stack 10 may also be referred to as a liquid crystal cell or a liquid crystal film and use of the term cell specifically means a separated layer stack. It will further be appreciated that the apparatus shown in FIG. 6, and the other thermoforming apparatuses described herein, are not drawn to scale, inasmuch as the liquid crystal cell 10 is typically thinner than the other components that are shown.

The apparatus 102A includes a track system 130 which carries and has received therein a holding fixture designated generally by the numeral 108. The holding fixture 108 is positionable with respect to a heating unit 112 and a mold 114. Together, the track system 130, the holding fixture 108, the heating unit 112 and the mold 114 coact with one another to thermoform the liquid crystal cell 10.

The track system 130 is shown in a vertical configuration, but it will be appreciated that it could be horizontally configured or configured in such a manner to facilitate manufacture of a thermoformed optical device. In any event, the track system 130 provides a number of tracks 132 wherein four tracks are shown. Of course, it will be appreciated that any number of tracks can be used. Each track 132 comprises a pair of opposed rails 134 that face one another to form the track. Each rail 134 provides a groove 136 which faces a groove of the opposed rail. Collectively, the tracks 132, when assembled with the associated supported structure, provide a track opening 138 which receives the other components of the apparatus, namely the holding fixture 108, the mold 114 and the heating unit 112.

The holding fixture 108 carries the liquid crystal cell, in tension so as to allow for thermoforming thereof. The holding fixture 108 includes opposed frames 110A and 110B, although it will be appreciated that a single frame could be utilized. Each frame 110 provides frame sides 140 which may be configured in a picture frame configuration as shown, or in any appropriately shaped construction. At a minimum, the frame sides 140 provide a frame opening 142. Each frame 110 has extending from the frame sides 140 at least one roller 144 which is receivable in the opening formed by the opposed rails 134. Although the holding fixture 108 is described herein as being movable with respect to the tracks by use of rollers, it will be appreciated that other sliding mechanisms or motorized mechanisms could be used to position the frames with respect to one another. One of the frames, specifically frame 110B, is provided with a latch pin 146 that extends from at least one frame side 140. The other frame 110A provides a latch lever 148 which extends from and is rotatably mounted to a frame side. The latch lever provides a hook 150 at a distal end. A latch handle 152 extends from the lever 148 and allows grasping thereof. Accordingly, the liquid crystal cell 10 is disposed on at least one of the frames and the two frames are brought together so as to place the cell in tension by the grasping of at least portions of the cell. After the frames are brought together, the latch lever 148 is rotated, moved or otherwise positioned so that the hook 150 engages the latch pin 146 so as to hold the frames together. Although a pin and latch lever are described herein, it will be appreciated that any type of clamping mechanism could be utilized to secure the frames to one another.

The mold 114 includes a platen 160 from which may also extend any number of platen rollers 162 that are receivable in the tracks. The rollers may facilitate alignment of the mold with the other components of the thermoformer, or alternative alignment mechanisms could be utilized. The mold 114 provides a mold surface 164 that is the engineered shape for the desired end product. The mold 114 is received in the track opening, and specifically the mold surface 164 is received in the frame opening 142. Thus, it will be appreciated that the mold 114 is movable with respect to the frame wherein the frame and the mold unit may be brought together, or one of the frame and the unit may be held in the stationary position while the other component is moved into position.

The heating unit 112 may also be slidably received in the track and may be movable with respect to the holding fixture 108. It will also be appreciated that the heating unit could also be positioned below the mold or anywhere in close proximity to the liquid crystal cell so that it is raised to a temperature sufficient to place the substrates of the liquid crystal cell into a plastic state to enable thermoforming thereof. The heating unit includes a power cord 166 which provides the appropriate electrical power to the heating elements contained within the heating unit 112.

Figure 7:
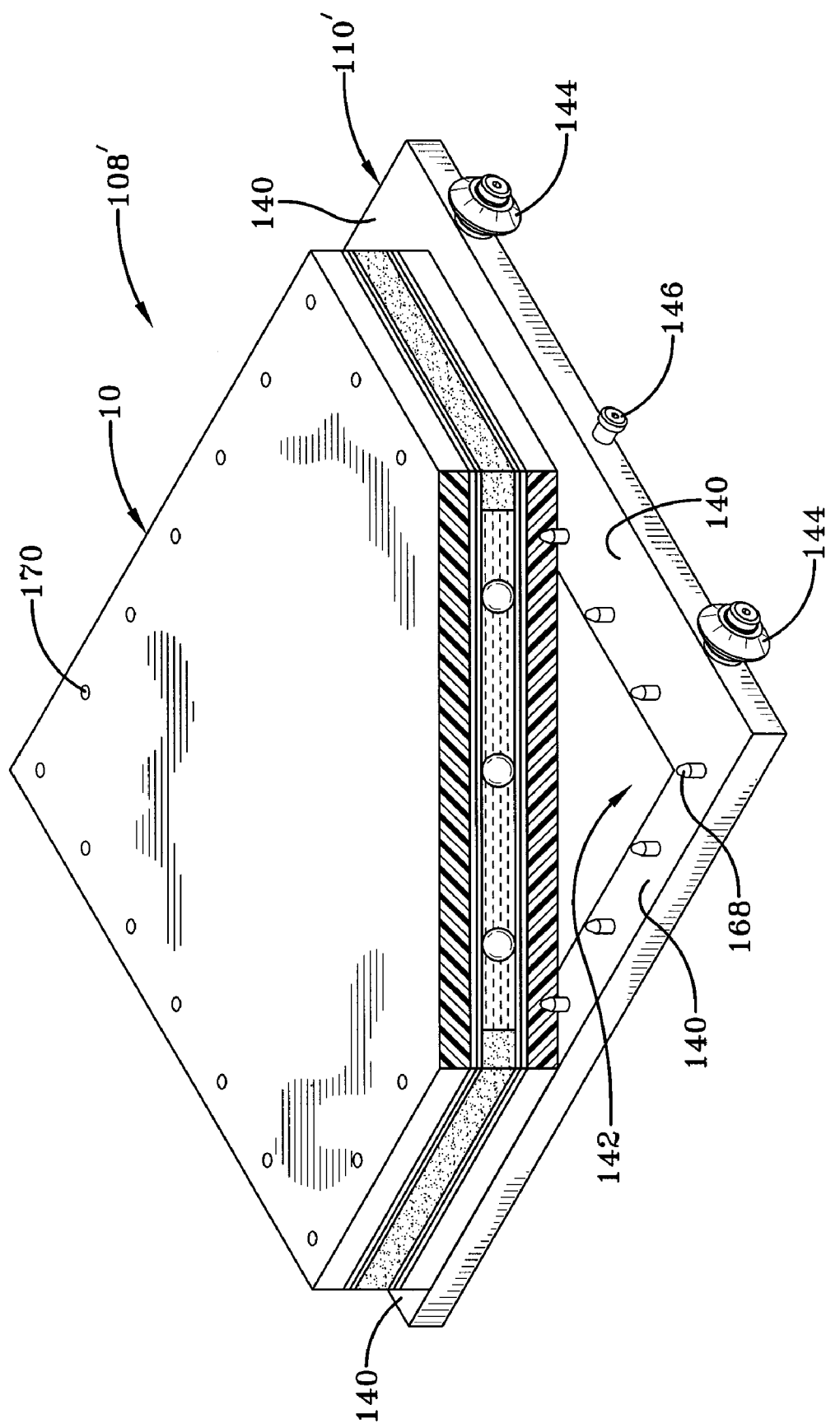
FIG. 7 is a perspective view of an alternative holding fixture with a separated layer stack, also referred to as a cell or film, shown in partial cross-section, wherein the holding fixture may be used in any of the thermoformers shown.

Referring now to FIG. 7, it can be seen that an alternative holding fixture 108' may be utilized in place of the holding fixture 108 shown in FIG. 6. In this embodiment, the holding fixture 108' includes a single frame 110' which provides a plurality of retention pins axially extending from the frame sides 140. Outer edges of the liquid crystal cell are positioned on the pins 168 so that the pins 168 grip into the substrates 12 to hold the cell in tension during the thermoforming process. Although only one frame may be required with retention pins, it will be appreciated that both frames could be provided with retention pins to secure and hold under tension the liquid crystal cell during the thermoforming process. Indentations 170 indicate how pins on an opposed frame would create, if provided, indentations on the surface of the liquid crystal cell.

Figure 8:
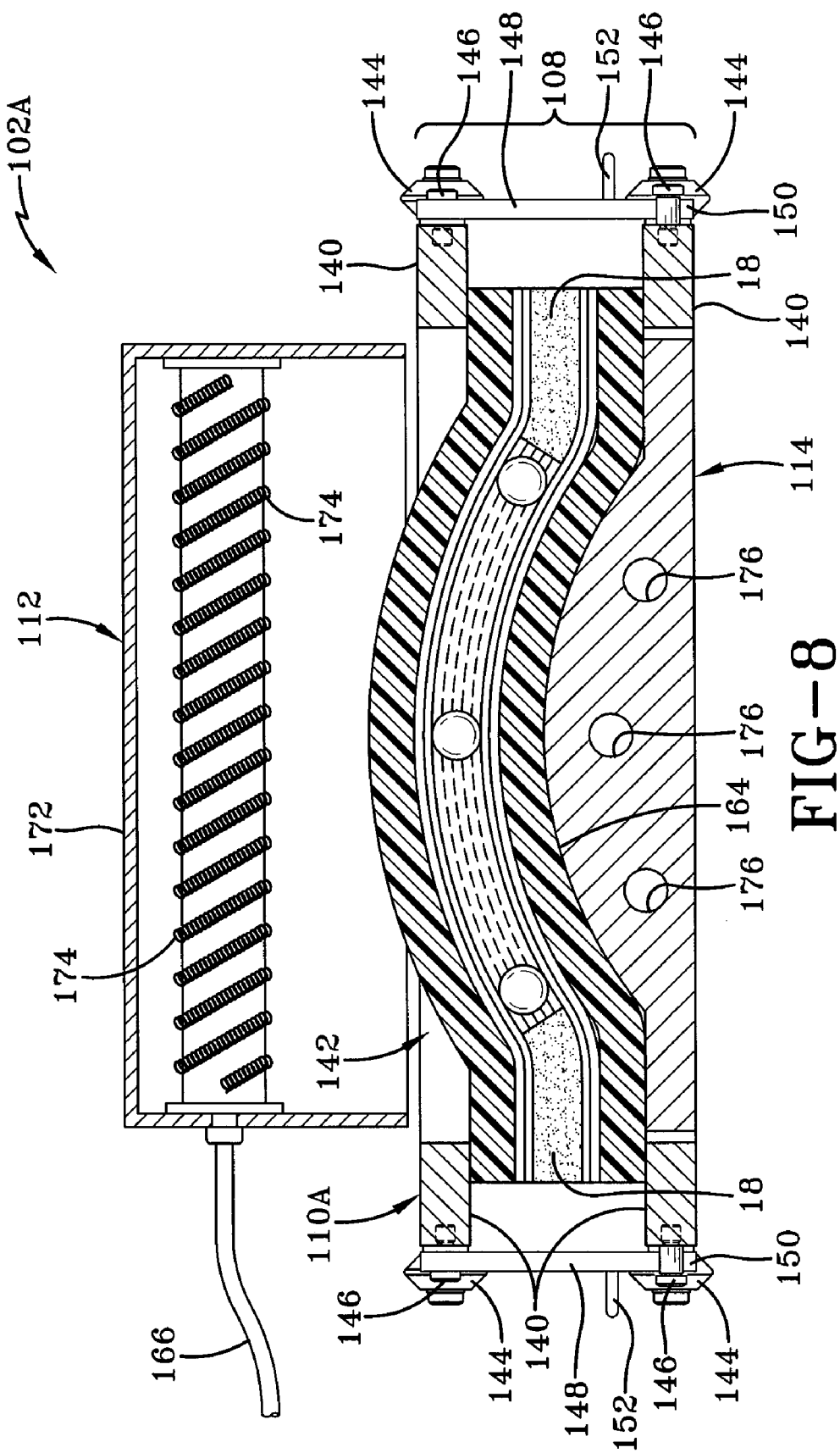
FIG. 8 is a partial cross-sectional view of the thermoformer shown in FIG. 6 and schematically showing selected components of the thermoformer, namely the holding fixture, a heating unit and a mold during the thermoforming process.

Referring now to FIG. 8, it can be seen that the components of the thermoformer 102A may be brought in close proximity to one another so as to impart a curved, doubly curved or complex curvature to the liquid crystal cell 10. It will be appreciated that movement of the components can be performed in any sequence so as to thermoform the liquid crystal cell film. For example, the heating unit may be used to first heat the liquid crystal cell so that the substrates are placed in a plastic state and somewhat simultaneously therewith, the mold 114 is brought into contact with the liquid crystal cell so as to impart the desired curvature. The heating unit 112 includes a housing 172 which contains a plurality of heating coils which may be provided in any arrangement that appropriately distributes heat about the liquid crystal cell. It will further be appreciated that the mold 114 may be provided with platen conduits 176 extending therethrough. This will allow for the mold itself to be provided with a heating and/or cooling source so as to facilitate the thermoforming process. After the components are brought together for a period of time to impart the desired shape, it will be appreciated that the heating element, or heating unit, could be moved away from the liquid crystal cell so as to allow the substrates to cool and take a set structure prior to removal of the mold 114. In other words, the cell would be allowed to cool so that the substrates are no longer in a plastic state. After appropriate cooling of the liquid crystal cell, the latching or clamping mechanism for the frames is removed and the cell is removed for further processing. It will also be appreciated that the cell substrates may be flexible enough so that the mold may be positioned to first impart the curvature to the device and wherein later application of the heat may be used to put the substrates in a plastic state whereupon removal of the heating source returns the cell substrates to a rigid state and then the mold can be removed from the contact with the liquid crystal cell. In any event, only a single engineered molding surface is utilized to deform the substrates in the desired manner. This process maintains the desired gap space in between the cell substrates so as to allow for a fully functional optical device with the desired clarity and optical properties required for an end use of the cell in goggles, eyewear or other related optical devices.

Figure 9A:
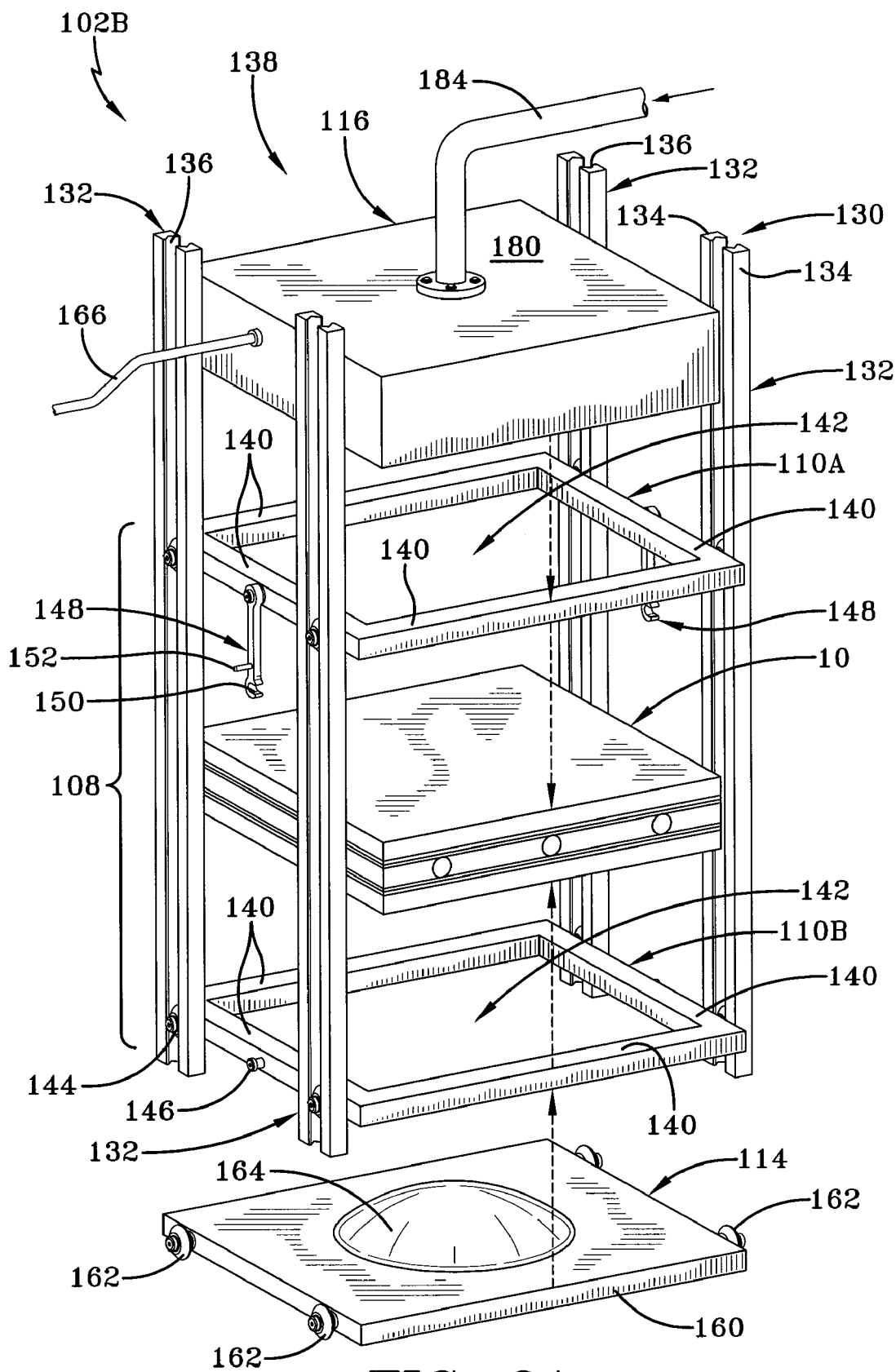
FIG. 9A is a perspective schematic diagram of a first alternative thermoformer according to concepts of the present invention.
Figure 9B:
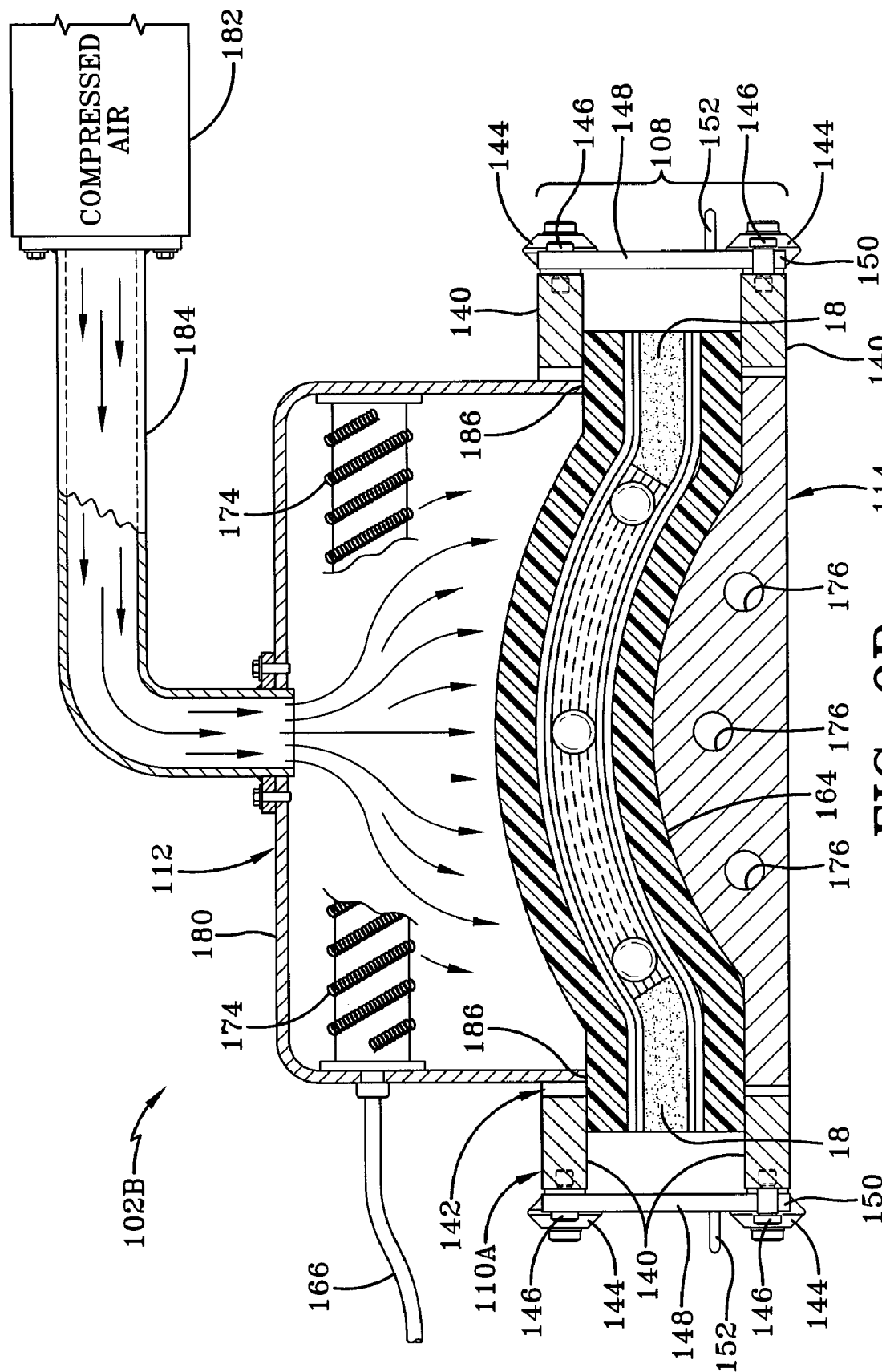
FIG. 9B is a partial cross-sectional view of the first alternative thermoformer shown in FIG. 9A and schematically showing selected components of the thermoformer, namely a holding fixture, a compressed air source with a heating unit, and a mold during the thermoforming process.

Referring now to FIGS. 9A and 9B, it can be seen that an alternative thermoformer is designated generally by the numeral 102B. In this embodiment, a pressure source 116 is utilized to assist in the thermoforming process. The pressure source 116 includes a housing 180 that fits around the liquid crystal cell and/or the frame so as to allow for an even distribution of pressure generated by a compressed air source 182. The housing 180 is connected to the compressed air 182 source by a conduit 184, and the housing also provides a seal edge 186 that may be positioned on or within the frame. It will further be appreciated that heating elements or coils 174 may be included in the housing 180 so as to allow for heat to be applied to the cell. In the alternative, heat may be provided through the platen conduits 176, or the compressed air may be heated to a desired temperature so as to cause the substrates to enter into a plastic state during the thermoforming process.

The thermoformer 102B operates in much the same manner as thermoformer 102A, however, it will be appreciated that the compressed air from the source 182 may be applied to the substrate during or after the heating process so as to assist the liquid crystal film cell in conforming to the mold surface during the thermoforming process. As such, use of the compressed air may decrease the amount of time required to thermoform the optical device. Additionally, use of the compressed air ensures uniformity of the finished product.

Figure 10A:
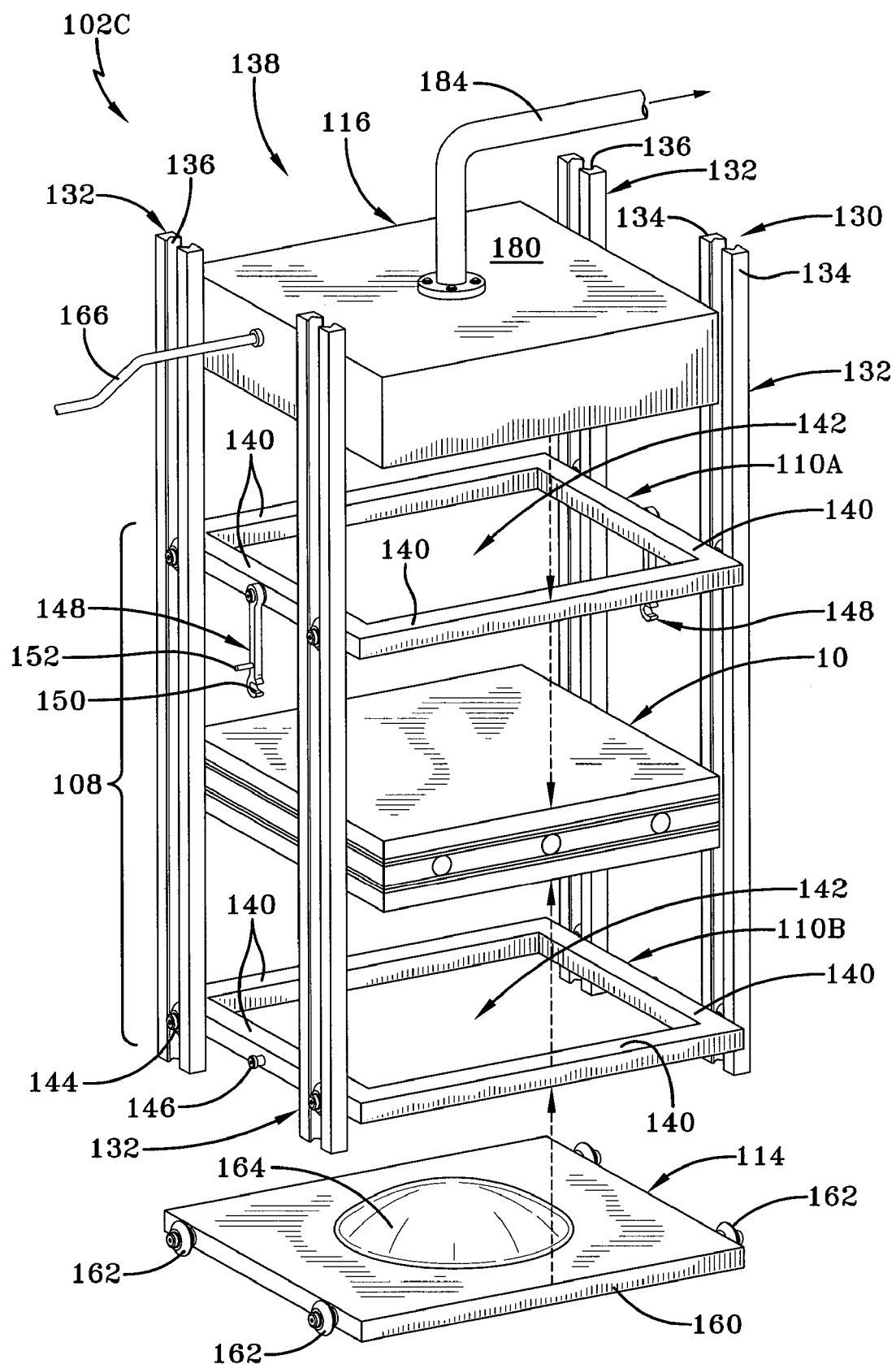
FIG. 10A is a perspective schematic diagram of a second alternative thermoformer according to concepts of the present invention.
Figure 10B:
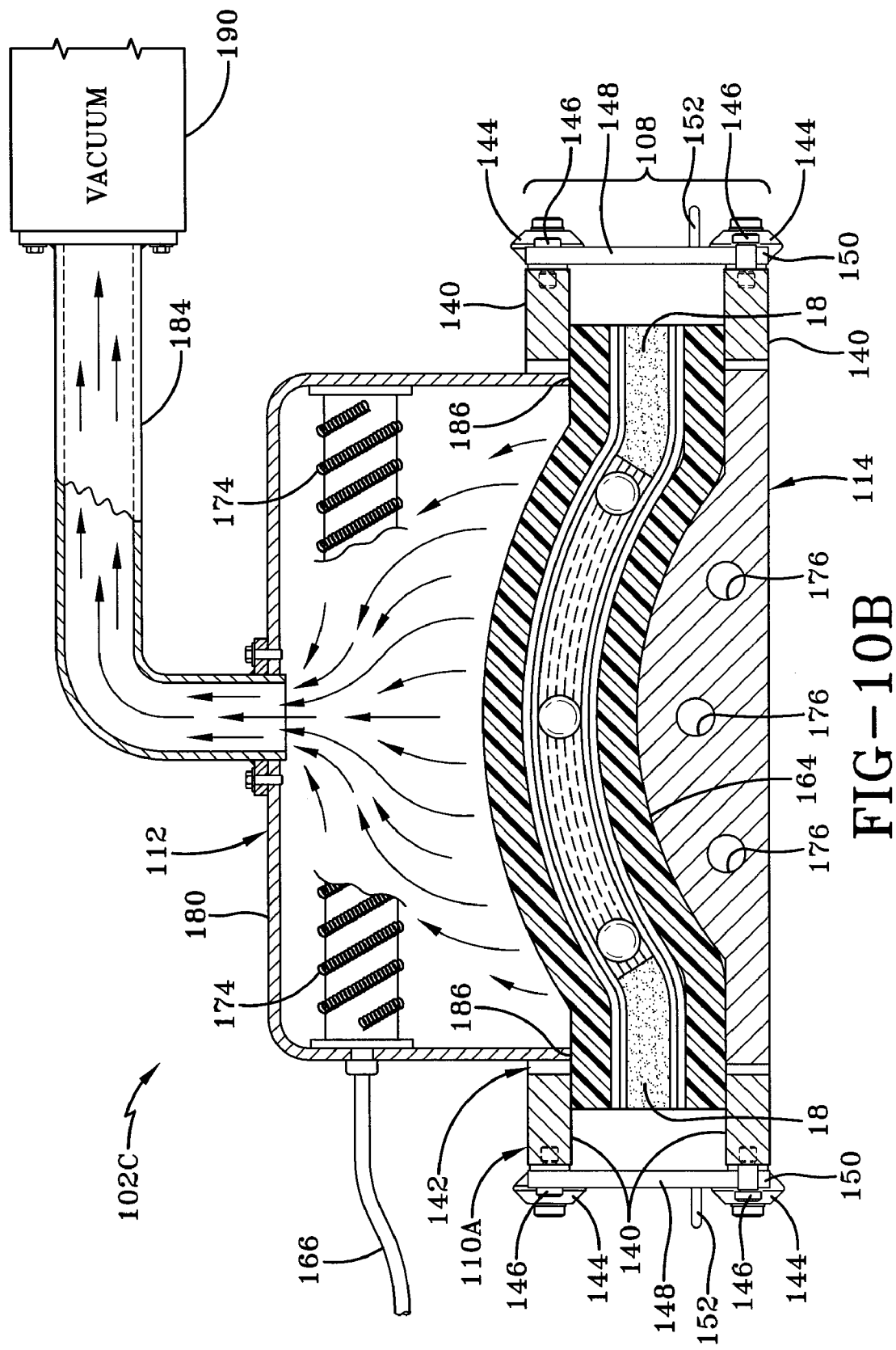
FIG. 10B is a partial cross-sectional view of the second alternative thermoformer shown in FIG. 10A and schematically showing selected components of the thermoformer, namely a holding fixture, a vacuum source with a heating unit, and a mold during the thermoforming process.

Referring now to FIGS. 10A and 10B, it will be appreciated that another alternative thermoformer is designated generally by the numeral 102C. This configuration is similar to the thermoformer 102B except that a vacuum 190 is utilized instead of a compressed air source. Use of a vacuum may be required depending upon the type of substrate material of the liquid crystal cell and also the amount of curvature required by the finished optical device product. In other words, if a complex curvature is required that has sharp angles or the like, the vacuum may be utilized to move the substrates into a desired shape in conjunction with the movement of the mold. Otherwise, undesired stretching of the substrates may occur, thus causing the desired gap distance between the substrates to be distorted, and rendering an ineffective optical device.

Figure 11A:
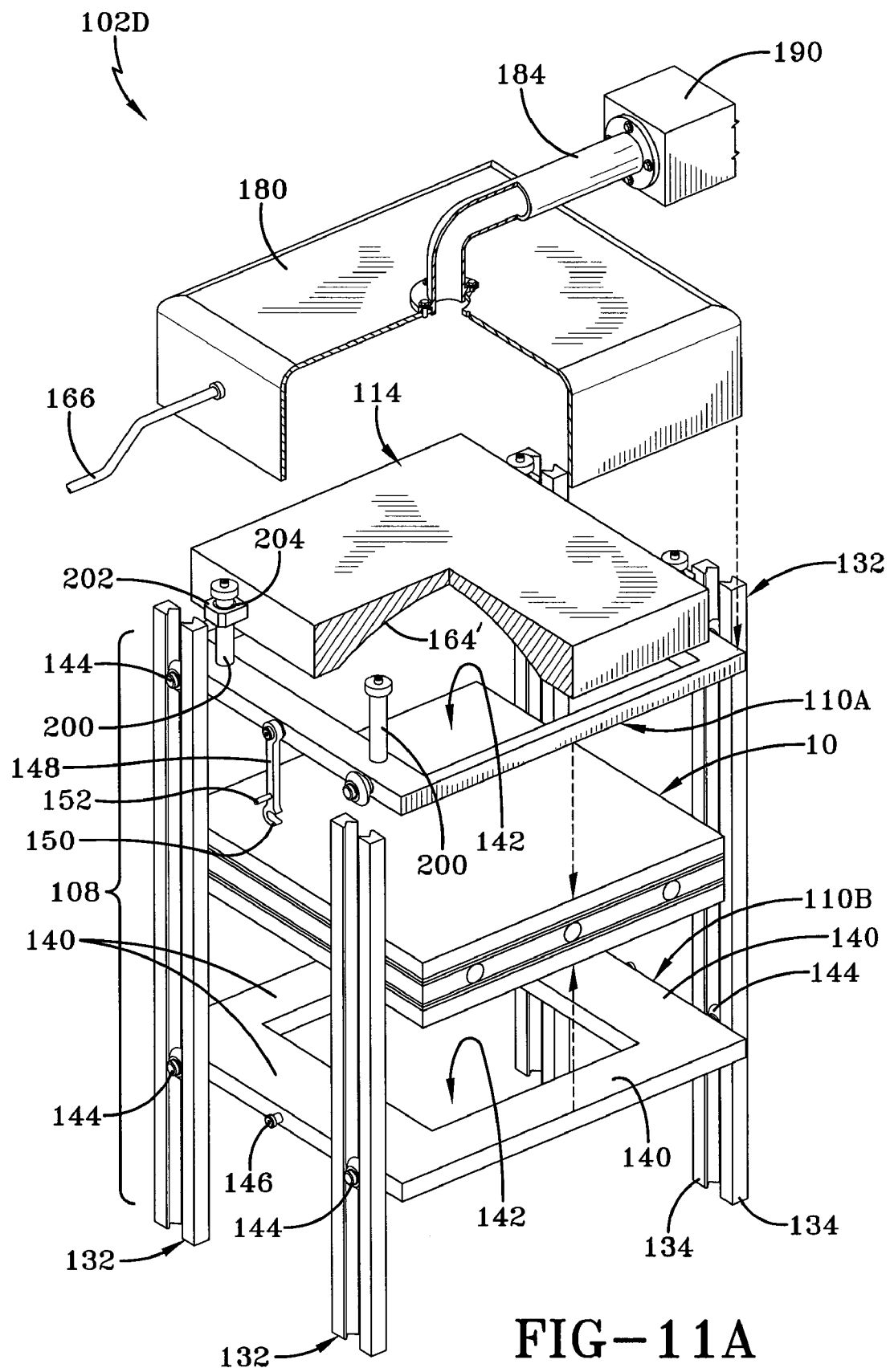
FIG. 11A is a perspective schematic diagram of a third alternative thermoformer according to concepts of the present invention.
Figure 11B:
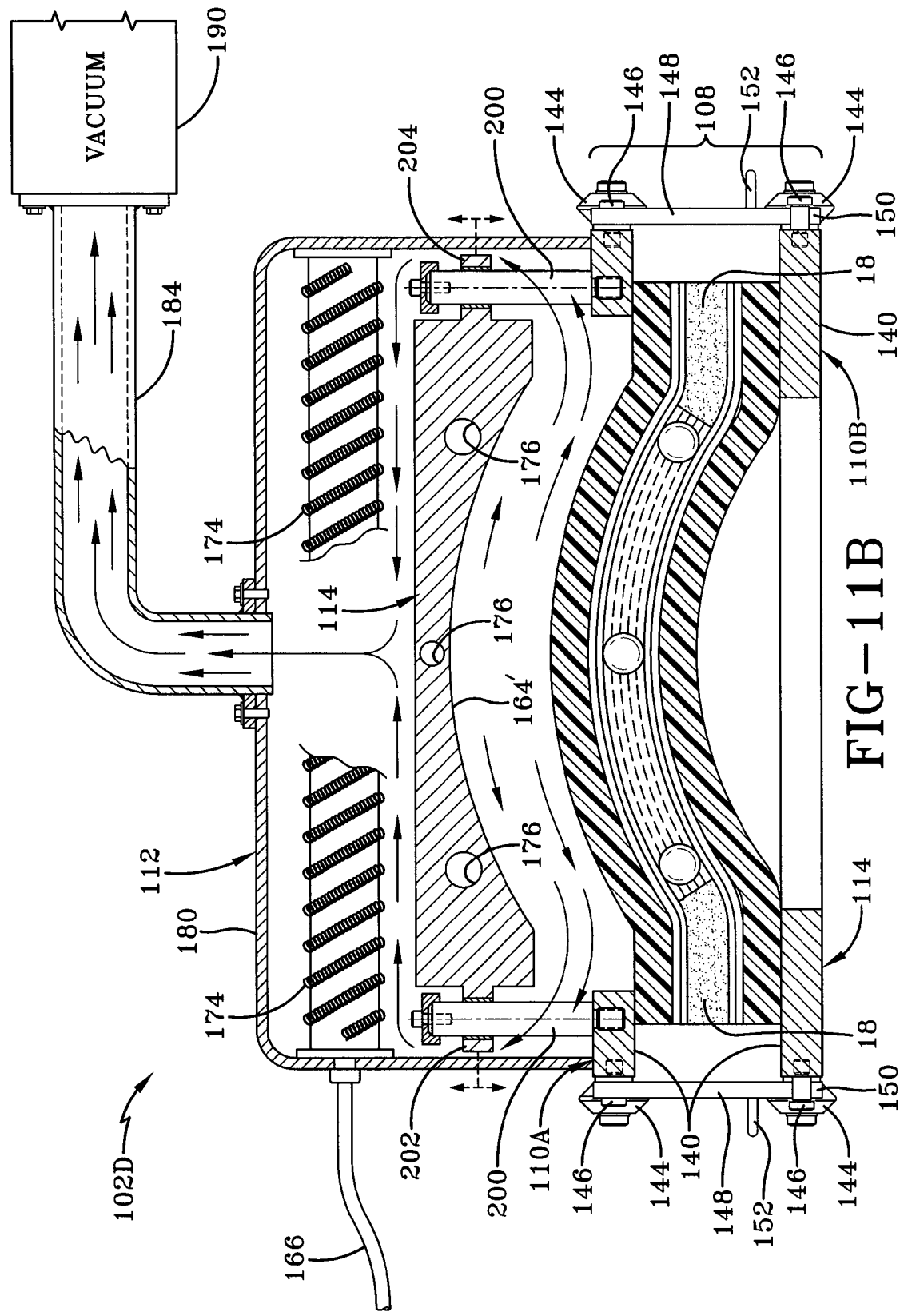
FIG. 11B is a partial cross-sectional view of the third alternative thermoformer shown in FIG. 11A and schematically showing selected components of the thermoformer, namely a holding fixture, a vacuum source with a heating unit and a mold during the thermoforming process.

Referring now to FIGS. 11A and 11B, another alternative thermoformer is designated generally by the numeral 102D. In this embodiment, the positioning of the mold 114 with respect to the holding fixture has been re-arranged. Specifically, the mold 114 is positioned between the holding fixture and the vacuum source. And in this embodiment, the mold 114 is provided with a concave mold surface 164'.

In this embodiment, the holding fixture 108 provides a plurality of platen pins 200 that extend axially from the frame 110A. The mold 114 provides at least one boss 202 extending from a side and each boss provides a hole 204 that slidably receives a corresponding platen pin 200. Accordingly, the mold 114 is movable in an aligned configuration with respect to at least one of the frames. Since the mold 114 is positioned between the holding fixture and the vacuum source, the application of a vacuum and movement of the mold is conducted in a somewhat simultaneous sequence of events so that as the substrates are heated, the vacuum pulls the substrates toward the vacuum source. Somewhat simultaneously, the mold is moved into a position so that the substrate facing the mold comes in contact with the engineered mold surface 164'. Accordingly, as the air is evacuated and heat applied to the cell, the mold is moved toward the cell. The cell is thermoformed from the vacuum pressure pulling the substrate of the cell against the mold surface. Use of such a configuration is dependent upon the plastics required for the optical device and the end curvature shape desired.

Figure 12A:
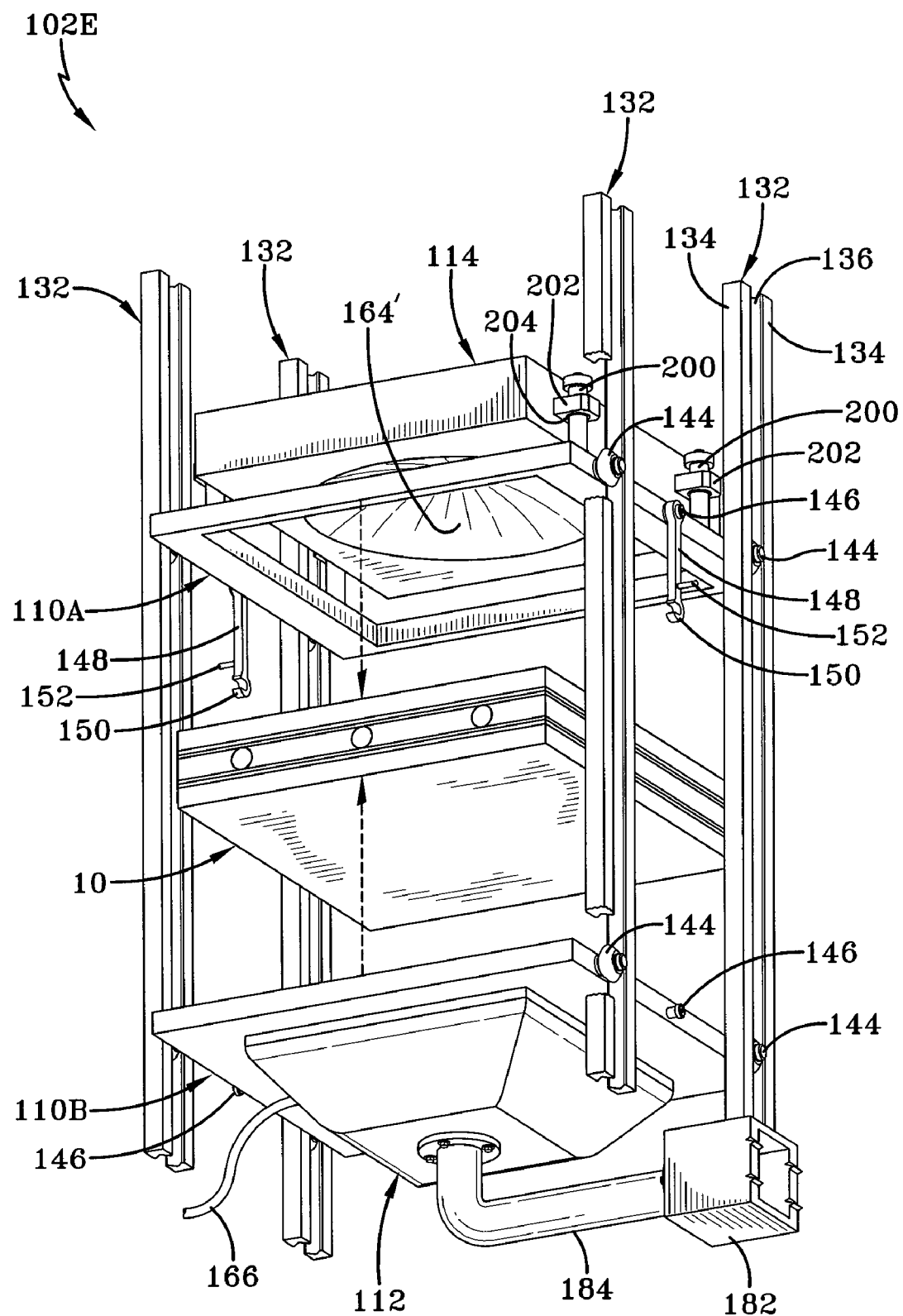
FIG. 12A is a perspective schematic diagram of a fourth alternative thermoformer according to concepts of the present invention.
Figure 12B:
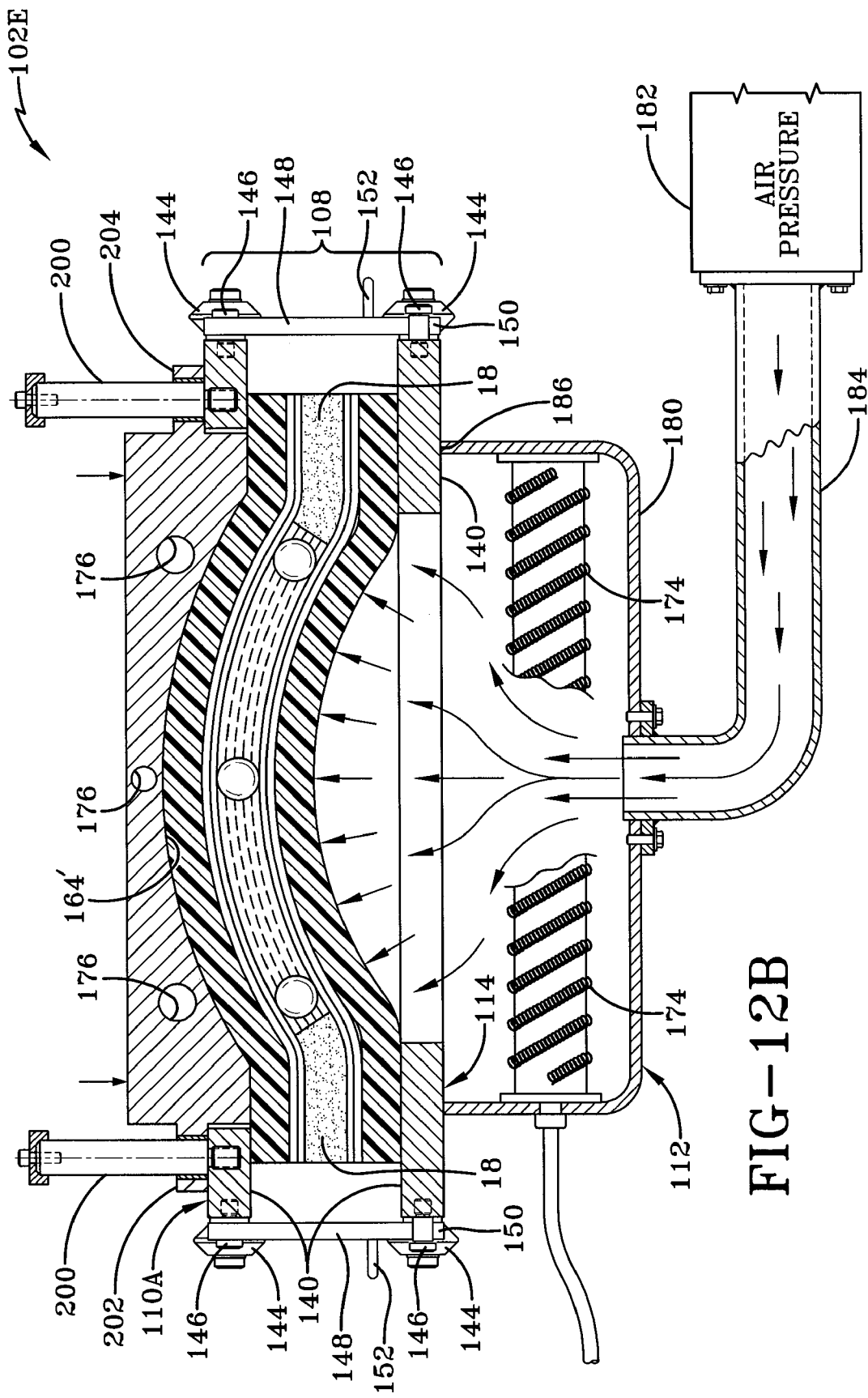
FIG. 12B is a partial cross-sectional view of the fourth alternative thermoformer shown in FIG. 12A and schematically showing selected components of the thermoformer, namely a holding fixture, a compressed air source with a heating unit and a mold during the thermoforming process.

Referring now to FIGS. 12A and 12B, another alternative thermoformer apparatus according to the present invention is designated generally by the numeral 102E. This configuration is similar to the one shown in FIGS. 9A and 9B except that the air pressure source is positioned beneath the cell substrates and the holding fixture and the mold is positioned above the holding fixture. Accordingly, as the substrates are heated, the air pressure source pushes the substrates into the engineered mold surface 164', wherein the mold is movable with respect to the holding fixture as needed.

Figure 13A:
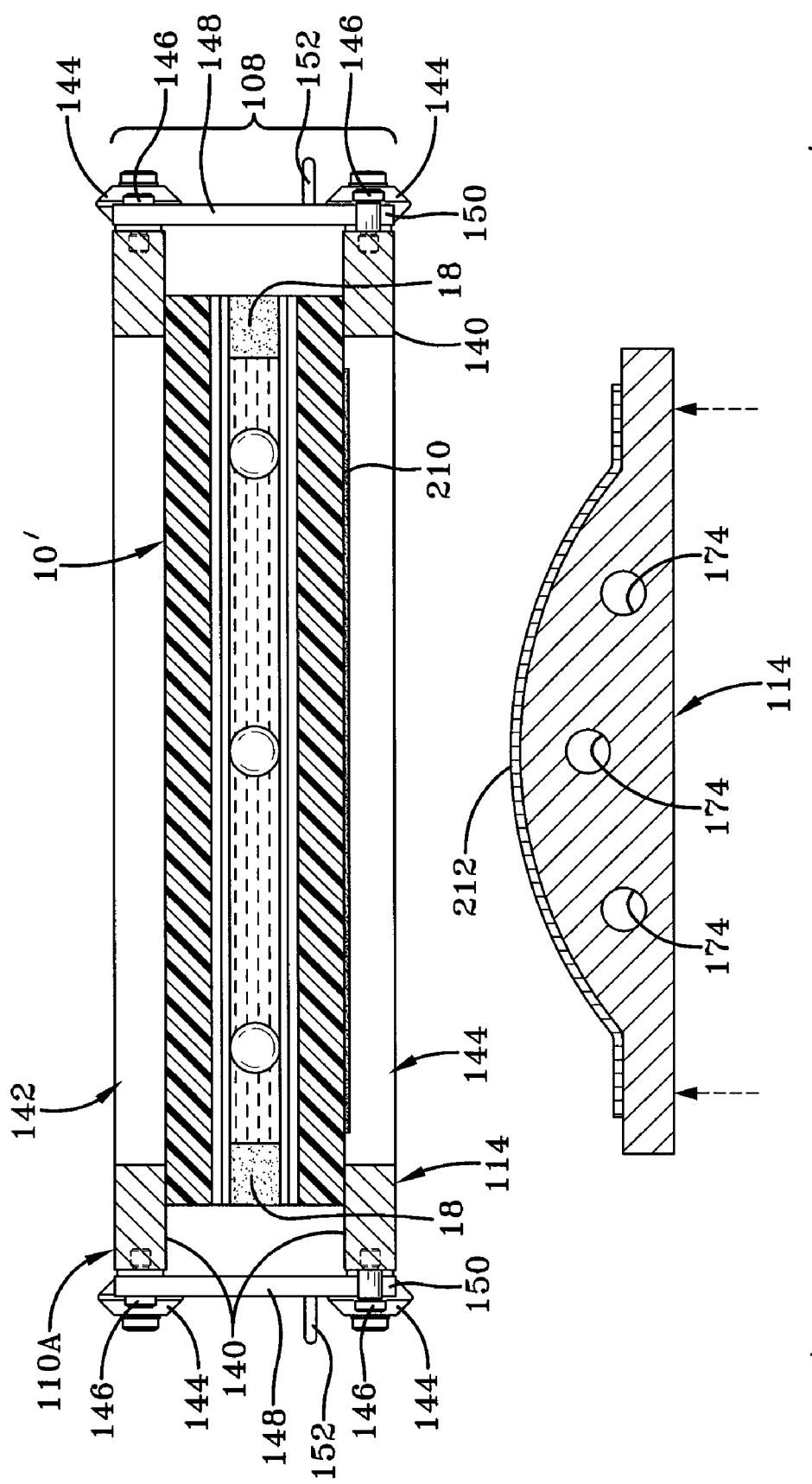
FIG. 13A is a partial cross-sectional view showing a holding fixture for the separated layer stack, which has a pressure sensitive adhesive disposed thereon, prior to attachment to a lens that is positioned between the stack and the mold.
Figure 13B:
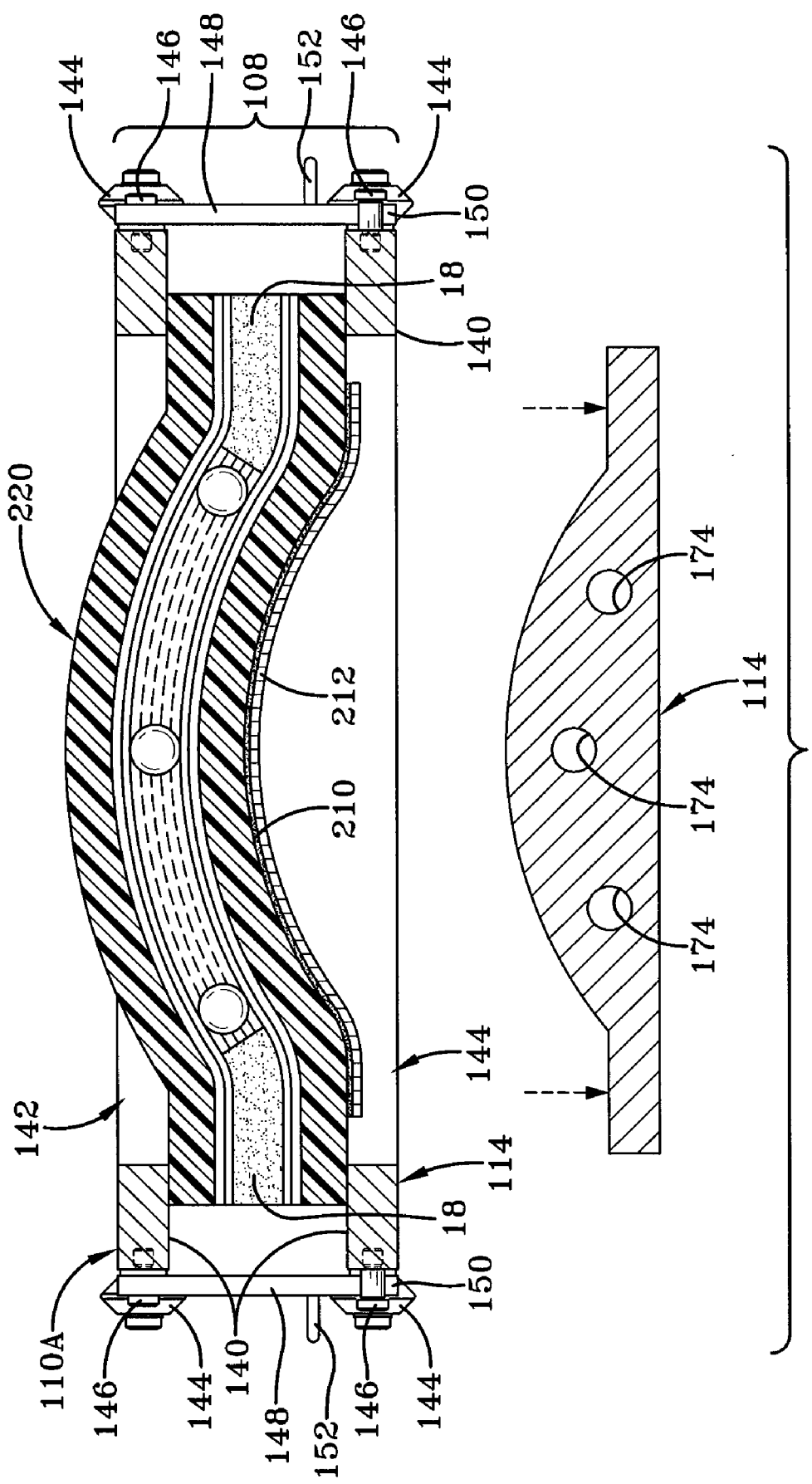
FIG. 13B shows the separated layer stack and the carrier attached to one another upon removal of the mold from the holding fixture, wherein the holding fixture and mold shown in FIGS. 13A and 13B can be used in any one of the aforementioned embodiments, to attach a carrier to a separated layer stack.

Referring now to FIG. 13A, it will be appreciated that any of the above thermoformers and associated processes described may be utilized in such a manner to attach the liquid crystal cell to a carrier, such as a lens or secondary optical device. As seen in FIG. 13A, the holding fixture 108 holds a liquid crystal cell 10' which may have an adhesive coating or a pressure sensitive adhesive 210 applied on at least one of the substrate surfaces. The mold 114 has disposed thereon a carrier such as pre-shaped lens 212 which conforms at least somewhat to the desired final shape. In the alternative, the lens material could be provided in a substantially flat configuration and thermoformed simultaneously with the cell 10'. In any event, the mold 114 is moved with respect to the holding fixture as described in any of the embodiments above and in such a manner that the adhesive 210 is brought into contact with the lens 212. Referring now to FIG. 13-B, after an appropriate period of time, the lens 212 becomes secured to the cell 10' and the mold is moved away so that a lens/cell assembly 220 is formed. In this manner, the lens is laminated or otherwise secured to the now formed cell. Such a configuration facilitates the formation of an optical device and reduces the processing time for the same. Although an adhesive material is used in the above processing, it will also be appreciated that an appropriate polymer or treated layer may be disposed on one of or both facing surfaces of the cell and the lens. As such, during the application of heat and pressure of any of the above thermoforming processes, the cell is bonded or otherwise secured to the lens. Indeed, if the material of the lens 212 and the facing substrate are chemically compatible with one another, the application of heat and pressure alone may cause the cell and the lens to be bonded to one another.

In all of the embodiments described, it will be appreciated that the separated layer stack or liquid crystal cell is provided with sealing edges 18 wherein the edges 18 are of such a dimension that they may extend into the curvature shape or are positioned to at least the bend of the curvature shape. In other words, the sealing edge 18 extends from an outer peripheral edge of the cell 10 inwardly to at least where a curvature of a thermoformed optical device transitions from a flat portion of the cell to a curved portion of the thermoformed cell. This facilitates the final manufacture of the device inasmuch as the edges that are held within the holding fixture may be cut away for fitting within a carrier device or optical frame which holds the finished liquid crystal cell configuration.

Based upon the foregoing, the thermoformers described herein provide many advantages. First, only a single rigid mold is utilized so as to impart a desired shape to the curved optical device. In conjunction with using just a single rigid mold, which provides a savings as far as tooling costs as opposed to two mold halves which need to be brought together, a vacuum or pressure source may be used in conjunction with a heating source so as to place the separated layer stack into a plastic state. Such a process also allows for the separated layer stack to be attached to other substrates or optical device components in a manner not presented in any of the known art.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method of constructing a thermoformed curved optical device, comprising:
   assembling at least one cell having opposed flexible polymer substrates, a sealing material disposed on at least a portion of an inner surface of said opposed substrates, and a plurality of spacers disposed between said opposed substrates, wherein said spacers maintain a controlled distance between said opposed substrates to form a gap adapted to receive a fluid;
   holding a portion of said at least one cell in a fixture;
   positioning a curved mold surface proximal said at least one cell;
   thermoforming said at least one cell by applying heat and compressive force to said at least one cell; and
   conforming said at least one cell to said mold surface so that said at least one cell permanently retains a curvature conforming to the curved mold shape when the heat and compressive force are removed while maintaining said controlled distance.

2. The method according to claim 1, further comprising providing said fixture with a frame having a plurality of pins extending therefrom; and securing said at least one cell to said plurality of pins.

3. The method according to claim 1, wherein the step of applying compressive force to said at least one cell comprises a force other than movement of said mold surface.

4. The method according to claim 3, wherein the step of applying a compressive force comprises applying a pressurized fluid source to said at least one cell.

5. The method according to claim 4, wherein said fluid in said pressurized fluid source is a liquid.

6. The method according to claim 3, wherein the step of applying a compressive force comprises applying vacuum to said at least one cell.

7. The method according to claim 1, wherein said curved mold surface has a substantially concave shape.

8. The method according to claim 1, wherein said curved mold surface has a substantially convex shape.

9. The method according to claim 1, further comprising;
   positioning a carrier between said curved mold surface and said at least one cell prior to said thermoforming step.

10. The method according to claim 9, further comprising;
    treating at least one of said cell and said carrier prior to said thermoforming step with a material to facilitate bonding between said cell and said carrier.

11. The method according to claim 10, wherein said material is a pressure sensitive adhesive.

12. The method according to claim 1, further comprising; providing said sealing material around an outer periphery of said cell and positioning said cell on said curved mold surface so that said sealing material extends at least to a transition area from a flat portion to a curved portion of the optical device.

13. The method according to claim 12, further comprising; positioning said cell so that said sealing material extends into said curved portion.

14. The method according to claim 1, wherein said at least one cell is curved in at least one direction.

15. The method according to claim 1, wherein the step of holding a portion of said at least one cell in a fixture comprises holding at least a portion of the cell's periphery in said fixture and wherein the step of applying a compressive force to said at least one cell comprises moving said curved mold surface toward said at least one cell so as to conform said at least one cell to said mold surface.

16. The method according to claim 1, further comprising:
disposing a fluid material into said gap adapted to receive a fluid before said thermoforming step.

17. The method according to claim 16, wherein said fluid comprises a liquid crystal material, a dye, or an electrochromic electrolyte.

18. The method according to claim 1, wherein the step of applying heat to said at least one cell raises the temperature of said at least one cell such as to place said flexible substrates into a plastic state to enable thermoforming thereof.

19. The method according to claim 1, further comprising:
removing said at least one cell from said fixture after the heat and compressive force are removed.

* * * * *